US012670399B2

(12) United States Patent
Harvey et al.

(10) Patent No.: US 12,670,399 B2
(45) Date of Patent: Jun. 30, 2026

(54) NEURAL NETWORKS WITH SUBDOMAIN TRAINING

(71) Applicant: PassiveLogic, Inc., Salt Lake City, UT (US)

(72) Inventors: Troy Aaron Harvey, Salt Lake City, UT (US); Jeremy David Fillingim, Salt Lake City, UT (US)

(73) Assignee: PassiveLogic, Inc., Holladay, UT (US)

( * ) Notice: Subject to any disclaimer, the term of this patent is extended or adjusted under 35 U.S.C. 154(b) by 1370 days.

(21) Appl. No.: 17/177,285

(22) Filed: Feb. 17, 2021

(65) Prior Publication Data

US 2021/0383235 A1      Dec. 9, 2021

Related U.S. Application Data

(60) Provisional application No. 62/704,976, filed on Jun. 5, 2020.

(51) Int. Cl.
| | |
|---|---|
| *G06N 3/084* | (2023.01) |
| *B60H 1/00* | (2006.01) |
| *F24F 11/64* | (2018.01) |
| *F24F 11/65* | (2018.01) |
| *F24F 120/10* | (2018.01) |

(Continued)

(52) U.S. Cl.
CPC ......... *G06N 3/084* (2013.01); *B60H 1/00285* (2013.01); *F24F 11/64* (2018.01); *F24F 11/65* (2018.01); *G05B 13/027* (2013.01); *G05B 13/04* (2013.01); *G05B 19/042* (2013.01); *G06F 17/16* (2013.01); *G06F 30/18* (2020.01); *G06F 30/27* (2020.01); *G06N 3/04*

(2013.01); *G06N 3/047* (2023.01); *G06N 3/048* (2023.01); *G06N 3/063* (2013.01); *G06N 3/08* (2013.01); *G06Q 10/067* (2013.01); *G06Q 50/163* (2013.01); *F24F 2120/10* (2018.01); *F24F 2120/20* (2018.01); *F24F 2140/50* (2018.01); *G05B 2219/2614* (2013.01); *G06F 2119/06* (2020.01); *G06F 2119/08* (2020.01)

(58) Field of Classification Search
None
See application file for complete search history.

(56) References Cited

U.S. PATENT DOCUMENTS

| | | | |
|---|---|---|---|
| 4,353,653 A | 10/1982 | Zimmerman | |
| 5,208,765 A | 5/1993 | Turnbull | |

(Continued)

OTHER PUBLICATIONS

Chen, F.-C., "Back-propagation neural networks for nonlinear self-tuning adaptive control," IEEE Control Systems Magazine, vol. 10, Iss. 3, (Apr. 1990) pp. 44-48. (Year: 1990).*

(Continued)

*Primary Examiner* — Brian M Smith

(57) ABSTRACT

Heterogenous neural networks are disclosed that have activation functions that hold multi-variable equations. These variables can be passed from one neuron to another. The neurons may be laid out in a topologically similar fashion to a physical system that the heterogenous neural network is modeling. A neural network may have inputs of more than one type. Only a portion of the inputs (a subdomain) may be optimized In such an instance, the neural network may run forward, backpropagate to all inputs, and then perform optimization only on those inputs which will be optimized.

17 Claims, 13 Drawing Sheets

(51) Int. Cl.

| | |
|---|---|
| F24F 120/20 | (2018.01) |
| G05B 13/02 | (2006.01) |
| G05B 13/04 | (2006.01) |
| G05B 19/042 | (2006.01) |
| G06F 17/16 | (2006.01) |
| G06F 30/18 | (2020.01) |
| G06F 30/27 | (2020.01) |
| G06F 119/08 | (2020.01) |
| G06N 3/04 | (2023.01) |
| G06N 3/047 | (2023.01) |
| G06N 3/048 | (2023.01) |
| G06N 3/063 | (2023.01) |
| G06N 3/08 | (2023.01) |
| G06Q 10/067 | (2023.01) |
| G06Q 50/163 | (2024.01) |
| F24F 140/50 | (2018.01) |
| G06F 119/06 | (2020.01) |

(56) References Cited

U.S. PATENT DOCUMENTS

| | | | |
|---|---|---|---|
| 5,224,648 | A | 7/1993 | Simon et al. |
| 5,581,659 | A | 12/1996 | Takatori |
| 6,119,125 | A | 9/2000 | Gloudeman et al. |
| 6,606,731 | B1 | 8/2003 | Baum et al. |
| 6,813,777 | B1 | 11/2004 | Weinberger et al. |
| 6,967,565 | B2 | 11/2005 | Lingemann |
| 7,447,664 | B2 | 11/2008 | Pado |
| 7,835,431 | B2 | 11/2010 | Belge |
| 9,020,647 | B2 | 4/2015 | Johnson et al. |
| 9,258,201 | B2 | 2/2016 | McCoy et al. |
| 9,298,197 | B2 | 3/2016 | Matsuoka et al. |
| 9,544,209 | B2 | 1/2017 | Gielarowski et al. |
| 9,557,750 | B2 | 1/2017 | Gust et al. |
| 9,664,400 | B2 | 5/2017 | Wroblewski et al. |
| 9,857,238 | B2 | 1/2018 | Malhotra et al. |
| 10,013,644 | B2 | 7/2018 | Takahashi |
| 10,094,586 | B2 | 10/2018 | Pavlovski et al. |
| 10,140,544 | B1 | 11/2018 | Zhao et al. |
| 10,845,815 | B2 | 11/2020 | Palanisamy et al. |
| 2002/0152298 | A1 | 10/2002 | Kikta et al. |
| 2008/0082183 | A1 | 4/2008 | Judge |
| 2008/0222584 | A1 | 9/2008 | Habib et al. |
| 2008/0270951 | A1 | 10/2008 | Anand et al. |
| 2008/0277486 | A1 | 11/2008 | Seem et al. |
| 2010/0005218 | A1 | 1/2010 | Gower et al. |
| 2010/0025483 | A1 | 2/2010 | Hoeynck et al. |
| 2010/0162037 | A1 | 6/2010 | Maule et al. |
| 2010/0237891 | A1 | 9/2010 | Lin et al. |
| 2013/0343207 | A1 | 12/2013 | Cook et al. |
| 2013/0343388 | A1 | 12/2013 | Stroud et al. |
| 2013/0343389 | A1 | 12/2013 | Stroud et al. |
| 2013/0343390 | A1 | 12/2013 | Moriarty et al. |
| 2013/0346987 | A1 | 12/2013 | Raney et al. |
| 2014/0277757 | A1 | 9/2014 | Wang et al. |
| 2016/0285715 | A1 | 9/2016 | Gielarowski et al. |
| 2017/0084294 | A1* | 3/2017 | Hartung ............... G10L 25/30 |
| 2017/0091622 | A1* | 3/2017 | Taylor ................... G06F 17/18 |
| 2017/0149638 | A1 | 5/2017 | Gielarowski et al. |
| 2017/0169075 | A1 | 6/2017 | Jiang et al. |
| 2017/0322579 | A1 | 11/2017 | Goparaju et al. |
| 2018/0202678 | A1 | 7/2018 | Ahuja et al. |
| 2018/0266716 | A1 | 9/2018 | Bender et al. |
| 2018/0350569 | A1* | 12/2018 | Kaneko ............... H01L 21/3065 |
| 2020/0133257 | A1 | 4/2020 | Cella et al. |
| 2020/0167442 | A1 | 5/2020 | Roecker et al. |
| 2021/0157312 | A1 | 5/2021 | Cella et al. |
| 2021/0182660 | A1 | 6/2021 | Amirguliyev et al. |
| 2021/0326571 | A1* | 10/2021 | Nakvosas ............... G06N 3/04 |
| 2021/0366793 | A1 | 11/2021 | Hung et al. |
| 2021/0397947 | A1 | 12/2021 | Li et al. |
| 2022/0070293 | A1 | 3/2022 | Harvey et al. |

OTHER PUBLICATIONS

Assad, et al., Back Propagation Neural Networks (BPNN) and Sigmoid Activation Function in Multi-Layer Networks, Academic Journal of Nawroz University 8(4):216, Nov. 2019.

ANSI/ASHRAE Standard 55-2013: Thermal Environmental Conditions for Human Occupancy, ASHRAE, 2013.

De Dear, et at., "Developing an Adaptive Model of Thermal Comfort and Preference," ASHRAE Transactions 1998, vol. 104, Part 1.

Gagge, et al., A Standard Predictive index of Human Response to the Thermal Environment, ASHRAE Transactions 1986, Part 2B.

Hatcher, John, "Smart Buildings get hyperaware", Smart Buildings Magazine, Aug. 24, 2020.

Medhi, et al.,Jan. 2011, "Model-Based Hierarchical Optimal Control Design for HVAC Systems," ASME 2011 Dynamic Systems and Control Conference and Bath/ASME Symposium on Fluid Power and Motion Control.

Nakahara, "Study and Practice on HVAC System Commissioning," The 4th international Symposium on HVAC, Beijing, China, Oct. 9-11, 2003.

Nassif, Nabil, (2005), Optimization of HVAC control system strategy using two-objective genetic algorithm [microform].

Perra, et al., "Monitoring Indoor People Presence in Buildings Using Low-Cost Infrared Sensor Array in Doorways," Sensors (Basel). Jun. 2021; 21(12): 4062.

Qin et al., "Commissioning and Diagnosis of VAV Air-Conditioning Systems," Proceedings of the Sixth International Conference for Enhanced Building Operations, Shenzhen, China, Nov. 6-9, 2006.

Salsbury et al., "Automated Testing of HVAC Systems for Commissioning," Laurence Livermore National Laboratory, 1999, LBNL-43639.

Serale, G., et al., "Model Predictive Control (MPC) for Enhancing Building and HVAC System Energy Efficiency: Problem Formulation, Applications and Opportunities," Energies 2018, 11, 631; doi:10.3390, Mar. 12, 2018.

Vaezi-Nejad, H.; Salsbury, T.; Choiniere, D. (2004). Using Building Control System for Commissioning. Energy Systems Laboratory (http://esl.tamu.edu); Texas A&M University (http://www.tamu.edu). Available electronically from http : / /hdl .handle .net /1969 .1 /5060.

Vanus et al., The design of an indirect method for the human presence monitoring in the intelligent building,Human-centric Computing and Information Sciences 8, Article No. 28 (2018).

Xiao et al., "Automatic Continuous Commissioning of Measurement Instruments in Air Handling Units," Building Commissioning for Energy Efficiency and Comfort, 2006, vol. VI-1-3, Shenzhen, China.

Nassif et al., "Self-tuning dynamic models of HVAC system components," 2008, Elsiever, Energy and Buildings 40, 1709-1720.

Rabunal et al., Aritficial Neural Networks in Real-Life Applications, 2006, Idea Group Publishing, Hershey, PA.

Rao, C++ Neural Networks and Fuzzy Logic, Jun. 1, 1995, MT Books, IDG Books Worldwide, Ind.

Rios, at al., "Derivative-free optimization: a review of algorithms and comparison of software implementations", J Glob Optimizers (2013) 56;1247-1293.

Sabor, et al., "Dynamic Routing Between Capsules," NIPS'17: Proceedings of the 31st International Conference on Neural Information Processing Systems, Dec. 2017, pp. 3859-3869.

Veelenturf, L. P. J., Analysis and applications of artificial neural networks, 1995, Prentice Hall International (UK0) Ltd, United Kingdom.

Welsh, "Ongoing Commissioning (OCx) with BAS and Data Loggers," National Conference on Building Commissioning: Jun. 3-5, 2009.

* cited by examiner

200

300

| Wall Neuron Activation Function 505 |
| --- |
| Equations that propagate state through a wall |
| Zone Neuron Activation Function 510<br>Equations that propagate state through air |

$R$ : Thermal resistance
$x$ : Layer thickness
$k$ : Thermal conductivity
$A$ : Surface area
$M$ : Layer mass
$C$ : Thermal capacitance
$C_p$ : Layer specific heat capacity
$T$ : Node temperature      ← 505B
$q$ : Heat transfer rate
$\Delta t$ : Timet step High level inputs and outputs of models

NEURAL NETWORKS WITH SUBDOMAIN TRAINING

RELATED APPLICATIONS

The present application hereby incorporates by reference the entirety of, and claims priority to, U.S. provisional patent application Ser. No. 62/704,976 filed Jun. 5, 2020, except for any disclaimers, disavowals, and inconsistencies.

The present application hereby incorporates by reference U.S. utility patent application Ser. No. 17/009,713, filed Sep. 1, 2020, except for any disclaimers, disavowals, and inconsistencies.

FIELD

The present disclosure relates to running a neural network. More specifically, the disclosure relates to running a subset of a neural network.

BACKGROUND

Building automation systems are used in buildings to manage energy systems, HVAC systems, irrigation systems, accessory building systems, controllable building structures, and the like. There has been little effort toward incorporating these systems into a controller with a unified operational model, thus allowing a more intelligent way of managing the energy interrelationships between various building components and their respective control algorithms. This is due, in part, because the field has been dominated by a piecemeal array of systems that each control only an irregular part of a system, or of a floor, or of a single control loop, consisting of a handful of separate pieces of equipment in a single location. There has been no overarching system that allows all these disparate systems to be integrated together in a coherent fashion. This makes sophisticated, tightly-coupled systems close to unmanageable. Further, adaptively tuning complex models cannot be adaptively tuned in a predictable, useful, manner.

There have been studies exploring the concept of automated systems to more accurately tune digital models of buildings by using actual building data. However, the methods used to date have typically required an occupancy-free training period, during which the building is subjected to an artificial test regime. This makes continuous model improvements difficult to impossible, and also limits the ability to create a digital model for an existing building. More importantly, the work to date has been limited to simple HVAC systems. They also lack the ability to scale to complex ad hoc arrangements that represent the diversity of systems and equipment that exist. In addition, the existing approaches lack a method to combine self-generated power with more typical plug-in systems.

Recently, a common approach in the industry has been to focus on building and energy monitoring and analytics with the intent of providing an energy "dashboard" for the building. Sophisticated examples of dashboards provide statistical based diagnostics of equipment behavior changes, failures, or the like. This "outside-the-box-looking-in" approach can provide information, about what has already happened, but provides little to no information about how the building will behave in the future.

SUMMARY

In embodiments, a system for optimizing a heterogenous neural network is disclosed, the system comprising: a processor; a memory in operational communication with the processor, a neural network which resides at least partially in the memory, the neural network comprising inputs of a first type, inputs of a second type, and a neural network optimizer including instructions residing in memory which are executable by the processor to perform a method which includes: propagating data forward from the inputs of the first type and inputs of the second type; determining a cost based on 1) intermediate values within the neural network and 2) desired values; calculating a gradient of a cost function based on the cost; backpropagating the gradient of the cost function through the neural network; using optimization to reduce error only for inputs of the first type; and updating the inputs of the first type.

In embodiments, the backpropagating is performed by automatic differentiation.

In embodiments, optimization comprises using stochastic gradient descent or mini-batch gradient descent.

In embodiments, optimization comprises using Momentum, Adagrad, AdaDelta, or ADAM.

In embodiments, the cost function comprises a weighted series of differences between output of the neural network and a time series of zone sensor values.

In embodiments, the cost function measures difference between a time series of zone sensor values and a neural network zone output time series.

In embodiments, weights of the weighted series of differences are adjusted based on time distance from a first time value.

In embodiments, inputs of the first type are temporary value inputs and inputs of the second type are permanent value inputs.

In embodiments, the neural network is a heterogenous neural network.

In embodiments, a method for optimizing a neural network, is disclosed, comprising: a controller having a processor, a memory in operational communication with the processor, a heterogenous neural network which resides at least partially in the memory, the heterogenous neural network comprising neurons, inputs of a first type, inputs of a second type; propagating data through the heterogenous neural network; determining a cost based on 1) intermediate values within the heterogenous neural network and 2) desired values; calculating a negative gradient of a cost function based on the cost; backpropagating a gradient of the cost function through the neural network; using gradient descent only to the inputs of the first type; and updating the inputs of the first type.

In embodiments, the neural network is run the neural network from time 1 to time n. When at time n, the cost has not reached a threshold, p time series data is propagated in timesteps from time 1 to time n+k.

In embodiments, an activation function of a neuron comprises a multi-variable equation.

In embodiments, the neurons are arranged topologically similar to a physical structure that the heterogenous neural network is simulating.

In embodiments, a neuron sends multiple outputs to another neuron.

In embodiments, the neuron outputs are activation function variables.

In embodiments, the activation function of a neuron uses a variable from a different neuron.

In embodiments, a computer-readable storage medium configured with data and with instructions is disclosed that upon execution by at least one processor in a controller computer system having computer hardware, programmable memory, and a heterogenous neural network in programable memory, the heterogenous neural network having neurons, inputs of a first type, inputs of a second type, and a neural network optimizer including instructions residing in memory which are executable by the processor to perform a technical process for neural network subdomain training, the technical process comprising: propagating data forward in the heterogenous neural network; determining a cost based on 1) intermediate values within the heterogenous neural network and 2) desired values; calculating a gradient of a cost function based on the cost; backpropagating the gradient of the cost function through the heterogenous neural network; using gradient descent to the intermediate values within the heterogenous neural network only to the inputs of the first type; and updating the inputs of the first type.

In embodiments, an activation function of a neuron comprises a multi-variable equation.

In embodiments, the neurons are arranged topologically similar to a physical structure that the heterogenous neural network is simulating.

In embodiments, the cost function comprises a weighted series of differences between output of the heterogenous neural network and a time series of zone sensor values.

These, and other, aspects of the invention will be better appreciated and understood when considered in conjunction with the following description and the accompanying drawings. The following description, while indicating various embodiments of the embodiments and numerous specific details thereof, is given by way of illustration and not of limitation. Many substitutions, modifications, additions or rearrangements may be made within the scope of the embodiments, and the embodiments includes all such substitutions, modifications, additions or rearrangements.

Figure 1:
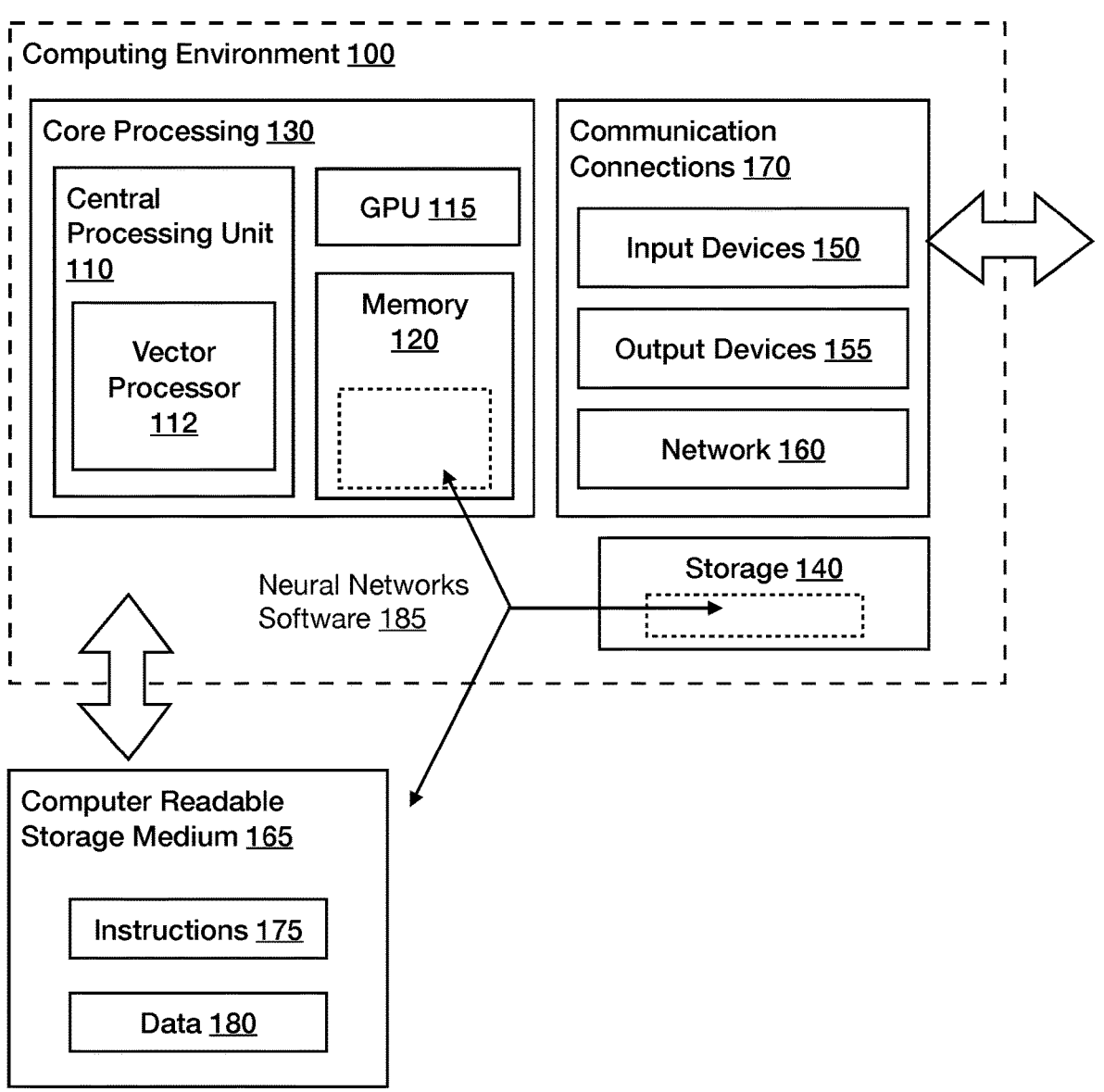
FIG. 1 depicts a computing system in conjunction with which described embodiments can be implemented.

Corresponding reference characters indicate corresponding components throughout the several views of the drawings. Skilled artisans will appreciate that elements in the FIGURES are illustrated for simplicity and clarity and have not necessarily been drawn to scale. For example, the dimensions of some of the elements in the figures may be exaggerated relative to other elements to help to improve understanding of various embodiments. Also, common but well-understood elements that are useful or necessary in a commercially feasible embodiment are often not depicted in order to facilitate a less obstructed view of these various embodiments.

DETAILED DESCRIPTION

Disclosed below are representative embodiments of methods, computer-readable media, and systems having particular applicability to heterogenous neural networks.

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Reference throughout this specification to "one embodiment", "an embodiment", "one example" or "an example" means that a particular feature, structure or characteristic described in connection with the embodiment or example is included in at least one embodiment of the present embodiments. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples.

Embodiments in accordance with the present embodiments may be implemented as an apparatus, method, or computer program product. Accordingly, the present embodiments may take the form of an entirely hardware embodiment, an entirely software embodiment (including firmware, resident software, micro-code, etc.), or an embodiment combining software and hardware aspects. Furthermore, the present embodiments may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present embodiments may be written in any combination of one or more programming languages.

Embodiments may be implemented in edge computing environments where the computing is done within a network which, in some implementations, may not be connected to an outside internet, although the edge computing environment may be connected with an internal internet. This internet may be wired, wireless, or a combination of both. Embodiments may also be implemented in cloud computing environments. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by general or special purpose hardware-based systems that perform the specified functions or acts, or combinations of general and special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

As used herein, the terms "comprises," "comprising," "includes," "including," "has," "having," or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of any term or terms with which they are utilized. Instead, these examples or illustrations are to be regarded as being described with respect to one particular embodiment and as being illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

"Program" is used broadly herein, to include applications, kernels, drivers, interrupt handlers, firmware, state machines, libraries, and other code written by programmers (who are also referred to as developers) and/or automatically generated. "Optimize" means to improve, not necessarily to perfect. For example, it may be possible to make further improvements in a program or an algorithm which has been optimized.

Additionally, any examples or illustrations given herein are not to be regarded in any way as restrictions on, limits to, or express definitions of any term or terms with which they are utilized. Instead, these examples or illustrations are to be regarded as being described with respect to one particular embodiment and as being illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

I. Overview

Artificial neural networks are powerful tools that have changed the nature of the world around us, leading to breakthroughs in classification problems, such as image and object recognition, voice generation and recognition, autonomous vehicle creation and new medical technologies, to name just a few. However, neural networks start from ground zero with no training. Training itself can be very onerous, both in that an appropriate training set must be assembled, and that the training often takes a very long time. For example, a neural network can be trained for human faces, but if the training set is not perfectly balanced between the many types of faces that exist, even after extensive training, it may still fail for a specific subset; at best, the answer is probabilistic; with the highest probability being considered the answer.

Existing approaches offer three steps to develop a deep learning AI model. The first step builds the structure of a neural network through defining the number of layers, number of neurons in each layer, and determines the activation function that will be used for the neural network. The second step determines what training data will work for the given problem, and locates such training data. The third step attempts to optimize the structure of the model, using the training data, through checking the difference between the output of the neural network and the desired output. The network then uses an iterative procedure to determine how to adjust the weights to more closely approach the desired output. Exploiting this methodology is cumbersome, at least because training the model is laborious.

Once the neural network is trained, it is basically a black box, composed of input, output, and hidden layers. The hidden layers are well and truly hidden, with no information that can be gleaned from them outside of the neural network itself. Thus, to answer a slightly different question, a new neural network, with a new training set must be developed, and all the computing power and time that is required to train a neural network must be employed.

We describe herein a way to train a heterogeneous neural network and to use the network to more accurately discover state values throughout a system modeled with the neural network. A typical neural network comprises inputs, outputs, and hidden layers connected by edges which have weights associated with them. The neural network sums the weights of all the incoming edges, applies a bias, and then uses an activation function to introduce non-linear effects, which basically squashes or expands the weight/bias value into a useful range; often deciding whether the neuron will, in essence, fire, or not. This new value then becomes a weight used for connections to the next hidden layer of the network. The activation function does not do separate calculations.

The neural networks disclosed herein have potentially different activation functions that may be equations that model portions of physical systems. The neural network may have more than one type of input. When a neural network is optimized, it may be optimized for less than all the inputs. For example, if the neural network has type one inputs and type two inputs, then the neural net may be run such that only inputs of type two are optimized. When the neural network is modeling a physical structure inputs of type one may be of temporary values in the structure, such as temperature and humidity. Inputs of type two may be of permanent values of the structure, such as layer mass and heat transfer rates. Running the neural net optimizing the inputs of type two may optimize the amount of energy that the building might use, while optimizing the inputs of type two may optimize the characteristics of the structure itself, giving a neural network that more closely mimics its digital twin building.

(64) II. Computing Environment

FIG. 1 illustrates a generalized example of a suitable computing environment 100 in which described embodiments may be implemented. The computing environment 100 is not intended to suggest any limitation as to scope of use or functionality of the disclosure, as the present disclosure may be implemented in diverse general-purpose or special-purpose computing environments.

With reference to FIG. 1, the core processing is indicated by the core processing 130 box. The computing environment 100 includes at least one central processing unit 110 and memory 120. The central processing unit 110 executes computer-executable instructions and may be a real or a virtual processor. It may also comprise a vector processor 112, which allows same-length neuron strings to be processed rapidly. In a multi-processing system, multiple processing units execute computer-executable instructions to increase processing power and as such the vector processor 112, GPU 115, and CPU can be running simultaneously. The memory 120 may be volatile memory (e.g., registers, cache, RAM), non-volatile memory (e.g., ROM, EEPROM, flash memory, etc.), or some combination of the two. The memory 120 stores software 185 implementing the described methods of heterogenous neural network creation and implementation.

A computing environment may have additional features. For example, the computing environment 100 includes storage 140, one or more input devices 150, one or more output devices 155, one or more network connections (e.g., wired, wireless, etc.) 160*a* s well as other communication connections 170. An interconnection mechanism (not shown) such as a bus, controller, or network interconnects the components of the computing environment 100. Typically, operating system software (not shown) provides an operating environment for other software executing in the computing environment 100, and coordinates activities of the components of the computing environment 100. The computing system may also be distributed; running portions of the software 185 on different CPUs.

The storage 140 may be removable or non-removable, and includes magnetic disks, magnetic tapes or cassettes, CD-ROMs, CD-RWs, DVDs, flash drives, or any other medium which can be used to store information and which can be accessed within the computing environment 100. The storage 140 stores instructions for the software 185 to implement methods of neuron discretization and creation.

The input device(s) 150 may be a device that allows a user or another device to communicate with the computing environment 100, such as a touch input device such as a keyboard, video camera, a microphone, mouse, pen, or trackball, and a scanning device, touchscreen, or another device that provides input to the computing environment 100. For audio, the input device(s) 150 may be a sound card or similar device that accepts audio input in analog or digital form, or a CD-ROM reader that provides audio samples to the computing environment. The output device(s) 155 may be a display, printer, speaker, CD-writer, or another device that provides output from the computing environment 100.

The communication connection(s) 170 enable communication over a communication medium to another computing entity. The communication medium conveys information such as computer-executable instructions, compressed graphics information, or other data in a modulated data signal. Communication connections 170 may comprise input devices 150, output devices 155, and input/output devices that allows a client device to communicate with another device over network 160. A communication device may include one or more wireless transceivers for performing wireless communication and/or one or more communication ports for performing wired communication. These connections may include network connections, which may be a wired or wireless network such as the Internet, an intranet, a LAN, a WAN, a cellular network or another type of network. It will be understood that network 160 may be a combination of multiple different kinds of wired or wireless networks. The network 160 may be a distributed network, with multiple computers, which might be building controllers, acting in tandem.

A computing connection 170 may be a portable communications device such as a wireless handheld device, a cell phone device, and so on.

Computer-readable media 165—any available non-transient tangible media that can be accessed within a computing environment—may also be included. By way of example, and not limitation, with the computing environment 100, computer-readable media include memory 120, storage 140, communication media, and combinations of any of the above. Computer readable storage media 165 which may be used to store computer readable media comprises instructions 175 and data 180. Data Sources may be computing devices, such as a general hardware platform servers configured to receive and transmit information over the communications connections 170. The computing environment 100 may be an electrical controller that is directly connected to various resources, such as HVAC resources, and which has CPU 110, a GPU 115, Memory, 120, input devices 150, communication connections 170, and/or other features shown in the computing environment 100. The computing environment 100 may be a series of distributed computers. These distributed computers may comprise a series of connected electrical controllers.

Although the operations of some of the disclosed methods are described in a particular, sequential order for convenient presentation, it should be understood that this manner of description encompasses rearrangement, unless a particular ordering is required by specific language set forth below. For example, operations described sequentially can be rearranged or performed concurrently. Moreover, for the sake of simplicity, the attached figures may not show the various ways in which the disclosed methods, apparatus, and systems can be used in conjunction with other methods, apparatus, and systems. Additionally, the description sometimes uses terms like "determine," "build," and "identify" to describe the disclosed technology. These terms are high-level abstractions of the actual operations that are performed. The actual operations that correspond to these terms will vary depending on the particular implementation and are readily discernible by one of ordinary skill in the art.

Further, data produced from any of the disclosed methods can be created, updated, or stored on tangible computer-readable media (e.g., tangible computer-readable media, such as one or more CDs, volatile memory components (such as DRAM or SRAM), or nonvolatile memory components (such as hard drives) using a variety of different data structures or formats. Such data can be created or updated at a local computer or over a network (e.g., by a server computer), or stored and accessed in a cloud computing environment.

Figure 2:
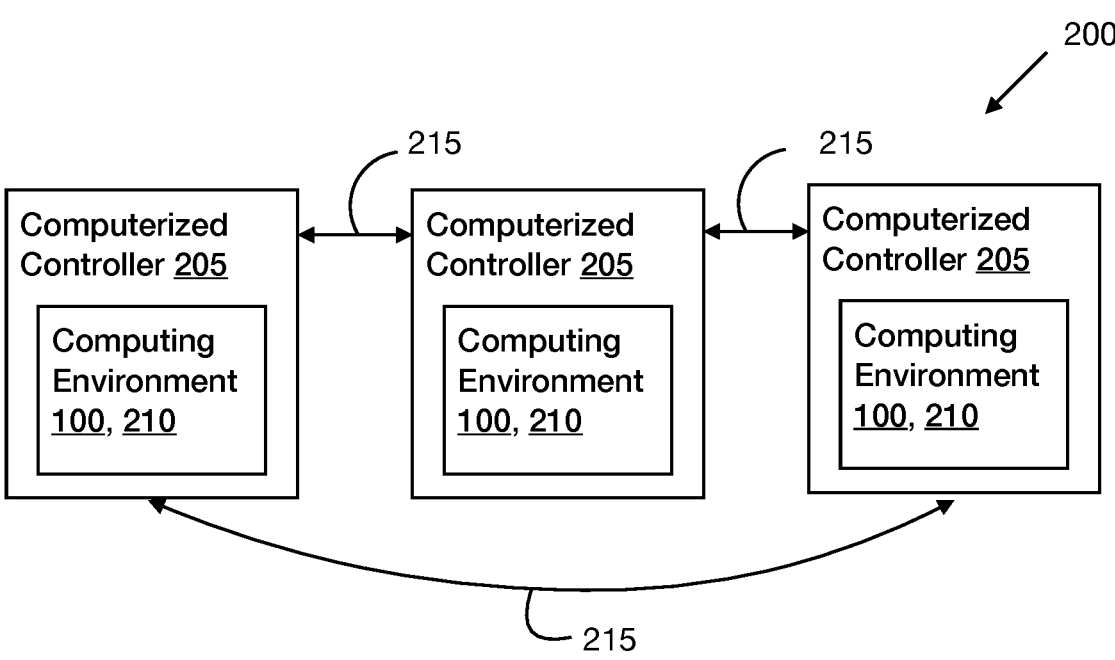
FIG. 2 is a functional block diagram of a distributed computerized controller system in conjunction with which described embodiments can be implemented.

FIG. 2 depicts a distributed computing system with which embodiments disclosed herein may be implemented. Two or more computerized controllers 205 may comprise all or part of a computing environment 100, 210. These computerized controllers 205 may be connected 215 to each other using wired or wireless connections 215. These computerized controllers may comprise a distributed system that can run without using connections (such as internet connections) outside of the computing system 200 itself. This allows the system to run with low latency, and with other benefits of edge computing systems.

III. Exemplary Neural Network Depictions

Figure 3:
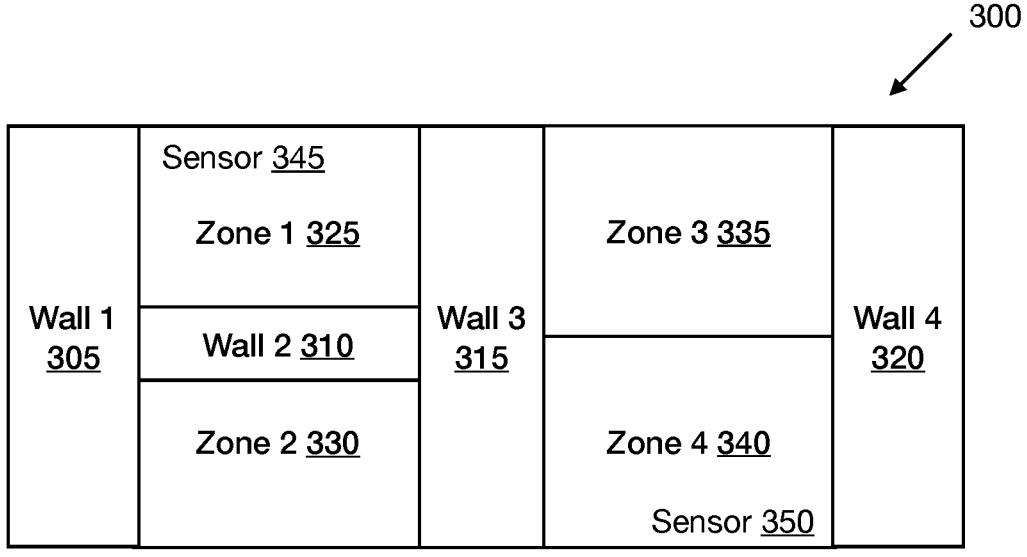
FIG. 3 depicts a physical system whose behavior can be determined by using a neural network.

FIG. 3 depicts a physical system 300 whose behavior can be determined by using a neural network, which may be a heterogenous neural network. A portion of a structure 300 is shown which comprises a Wall 1 305. This Wall 1 305 is connected to a room which comprises Zone 1 325. This zone also comprises a sensor 345 which can determine state of the zone. Wall 2 310 is between Zone 1 325 and Zone 2 330. Zone 2 does not have a sensor. Wall 3 315 is between the two zones 1 325 and 2 330 and the two zones Zone 3 335 and Zone 4 340. Zone 3 and Zone 4 do not have a wall between them. Zone 4 has a sensor 350 that can determine state in Zone 4. Zones 3 335 and Zone 4 340 are bounded on the right side by Wall 4 320.

Figures 4, 5:
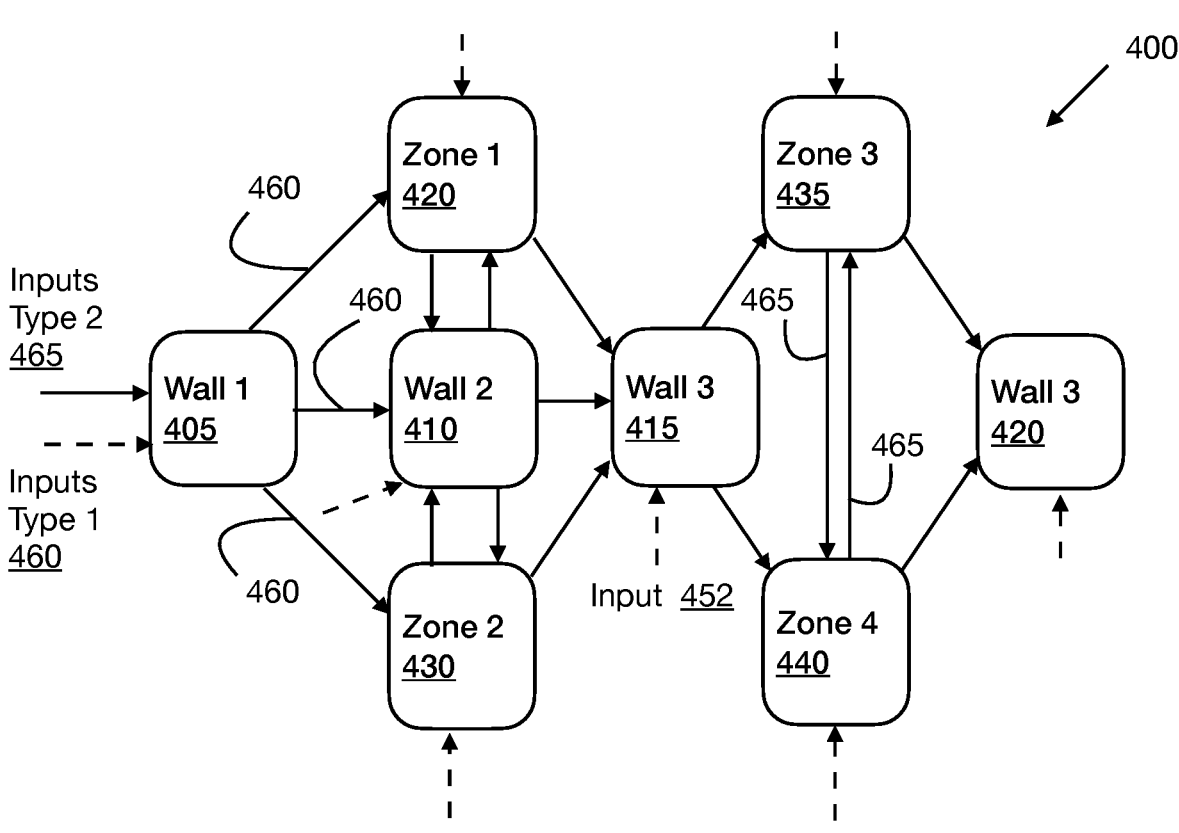
FIG. 4 depicts a simplified neural network that may be used to model behaviors of the physical system of FIG. 3.
FIG. 5 depicts a block diagram 500 that describes some general ideas about activation functions.

FIG. 4 depicts a simplified heterogenous neural network 400 that may be used to model behaviors of the simplified physical system of FIG. 3. In some embodiments, areas of the structure are represented by neurons that are connected with respect to the location of the represented physical structure. The neurons are not put in layers, as in other types of neural networks. Further, rather than being required to determine what shape the neural network should be to best fit the problem at hand, the neural network configuration is, in some embodiments, determined by a physical layout; that is, the neurons are arranged topologically similar to a physical structure that the neural net is simulating.

For example, Wall 1 305 is represented by neuron 405. This neuron 405 is connected by edges 460 to neurons representing Zone 1 420, Wall 2 410, and Zone 2 430. This mirrors the physical connections between Wall 1 305, Zone 1 325, Wall 2 310, and Zone 2 330. Similarly, the neurons for Zone 1 420, Wall 2 410, and Zone 2 430 are connected by edges to the neuron representing Wall 3 415. The neuron representing Wall 3 415 is connected by edges to the neurons representing Zone 3 435 and Zone 4 440. Those two neurons 435, 440 are connected by edges to the neuron representing Wall 3 420. Even though only one edge is seen going from one neuron to another neuron for clarity in this specific figure, a neuron may have multiple edges leading to another neuron, as will be discussed later. Neurons may have edges that reference each other. For example, edge 460 may be two-way.

In some implementations, the edges have inputs that are adjusted by activation functions within neurons. Some inputs may be considered temporary properties that are associated with the physical system, such as temperature. In such a case, a temperature input represented in a neural network 400 may represent temperature in the corresponding location in the physical system 300, such that a temperature input in Neuron Zone 1 420 can represent the temperature at the sensor 345 in Zone 1 325. In this way, the body of the neural net is not a black box, but rather contains information that is meaningful (in this case, a neuron input represents a temperature within a structure) and that can be used.

In some implementations, inputs may enter and exit from various places in the neural network, not just from an input and an output layer. This can be seen with inputs of type 1, which are the dashed lines entering each neuron. Inputs of type 2 are the straight lines. In the illustrative example, each neuron has at least one input. For purposes of clarity not all inputs are included. Of those that are, inputs of type 2 are marked with a straight line, where inputs of type 1 are marked with a dashed line. Input 450 is associated with the neuron that represents Wall1 405, while input 452 is associated with Wall 3 415. Signals, (or weights) passed from edge to edge, and transformed by the activation functions, can travel not just from one layer to the layer in a lock-step fashion, but can travel back and forth between layers, such as signals that travel along edges from Zone 1 420 to Wall 2 410, and from there to Zone 2 430. Further, there may be multiple inputs into a single neuron, and multiple outputs from a single neuron. For example, a system that represents a building may have several inputs that represent different states, such as temperature, humidity, atmospheric pressure, wind, dew point, time of day, time of year, etc. These inputs may be time curves that define the state over time. A system may have different inputs for different neurons. In some embodiments, inputs may be time curves, which defines the state at a particular time, over a period of time.

In some implementations, outputs are not found in a traditional output layer, but rather are values within a neuron within the neural network. These may be located in multiple neurons. These outputs for a run may be time curves. For example, Zone 1 420 may have a temperature value that can be looked at each timestep of a model run, creating temperature time curves that represent the temperature of the corresponding physical Zone 1 325.

In some embodiments, activation functions in a neuron transform the weights on the upstream edges, and then send none, some, or all of the transformed weights to the next neuron(s). Not every activation function transforms every weight. Some activation functions may not transform any weights. In some embodiments, each neuron may have a different activation function. In some embodiments, some neurons may have similar functions.

FIG. 5 is a block diagram 500 that describes some general ideas about activation functions. Activation functions in traditional neural networks scale the sum of the weighted values (plus a bias) so that the ending value is within a range. It is a single function that is non-linear to allow the different layers of the neural network to be stacked in a meaningful way while simultaneously squishing or stretching the weighted value to be sure the values are within a certain range. Here, we disclose using the activation function in a completely different manner. The activation function may be used as an actual function that describes changes that the object the neuron is describing makes to inputs. For example, a wall neuron may have an activation function 505 that propagates state through a wall. For example, a wall neuron may have an edge with a temperature that enters and an edge with a temperature that exits. The activation function will determine the difference in temperature from one edge of the wall to the other for a given timestep. Similarly, a zone neuron activation function 510 may comprise equations that propagate state (such as temperature) through the air in the room for a given timestep.

Figures 5A, 5B:
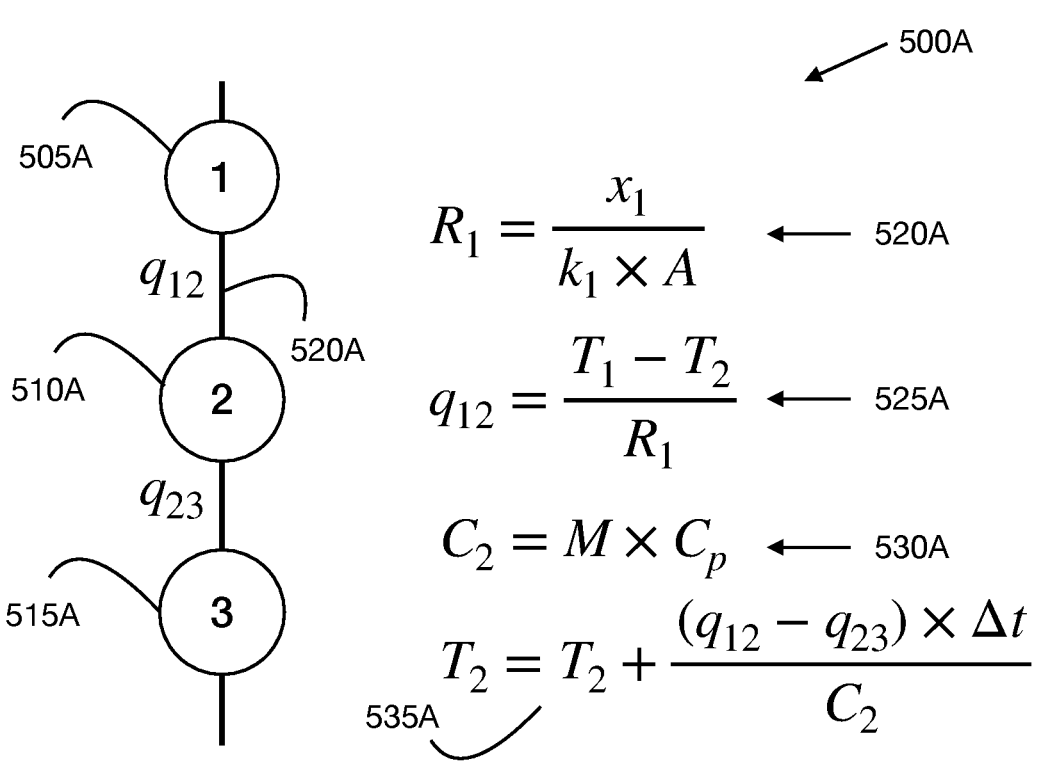
FIG. 5A depicts a set of equations that may be used in an activation function.
FIG. 5B is describes some variables that may be used in an activation function.

FIG. 5A is an equation block and diagram 500A that describes a possible activation function. In some embodiments, activation functions are multi-variable equations, as shown with reference to FIG. 5A. This activation function determines the neuron temperature $T_2$ at neuron 2 510A, which requires information from connected neuron 1 505A and neuron 3 515A.

FIG. 5B is a key for equations 520A, 525A, 530A, and 535A. The key provides a list of the variables that may be used in the activation function. Any of the variables shown, or internal variables may be activation function values. To explain a bit of the nomenclature, Ri in equation 520A is the thermal resistance of neuron 1 505A; $T_2$ is the previous temperature of neuron 2 in equation 525A, q23 is the heat transfer rate between neuron 2 510A and neuron 3 515A. As can be seen, the neuron activation function may comprise multiple equations and multiple variables.

Figure 6:
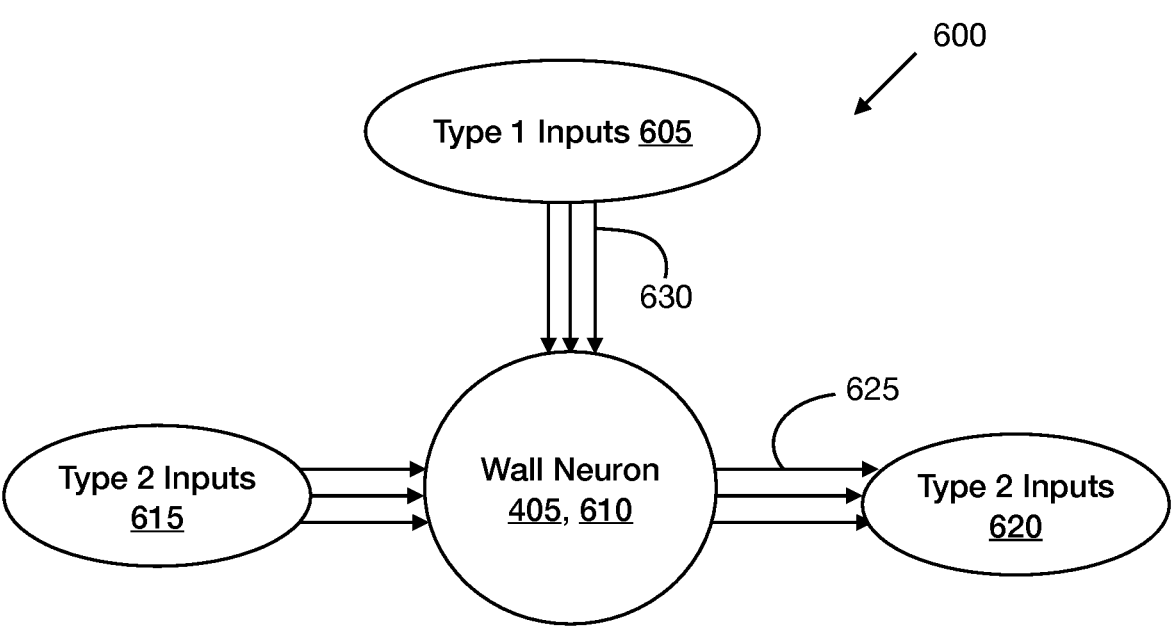
FIG. 6 depicts a portion of an exemplary neural network neuron with its associated inputs and outputs.
Figure 7:
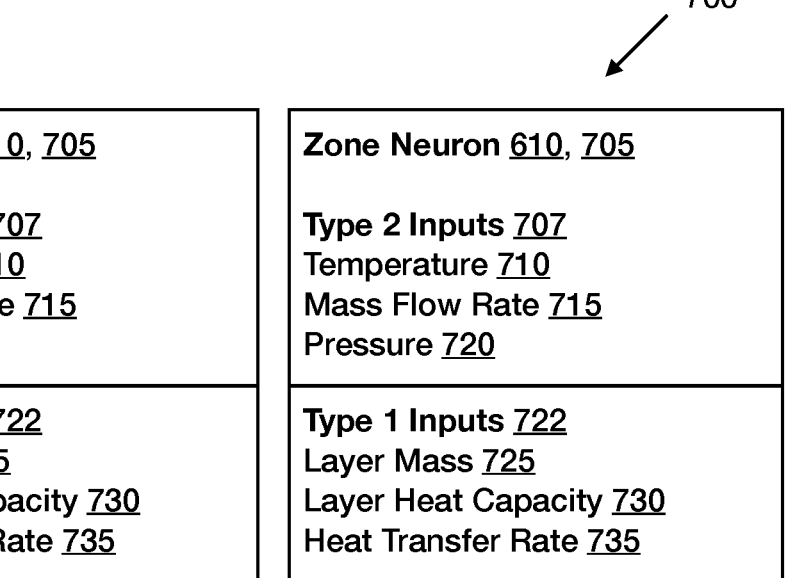
FIG. 7 is a block diagram describing the nature of exemplary neurons.

FIG. 6 is a diagram 600 that depicts a portion of an exemplary neuron with associated inputs and outputs. FIG. 7 is a block diagram 700 describing the inputs of FIG. 6 in more detail. The wall neuron 610, 705 has three air connection 615 upstream edges, which can also be considered type 2 inputs. In some embodiments, these may be temporary values within the structure. In this illustrative embodiment they comprise the following weights: Temperature 710, Mass Flow Rate 715, and Pressure 720. There are also three type 1 inputs 655 (in some embodiments, property/permanent input) edges 630 that are associated with the neuron itself—Layer Mass 725, Layer Heat Capacity 730, and Heat Transfer Rate 735. The type 2 inputs 615 and the type 1 inputs 605 are used in the wall neuron activation function 505 to produce three downstream edges 625 that represent the three type 1 inputs 710, 715, 720.

Figures 8, 12:
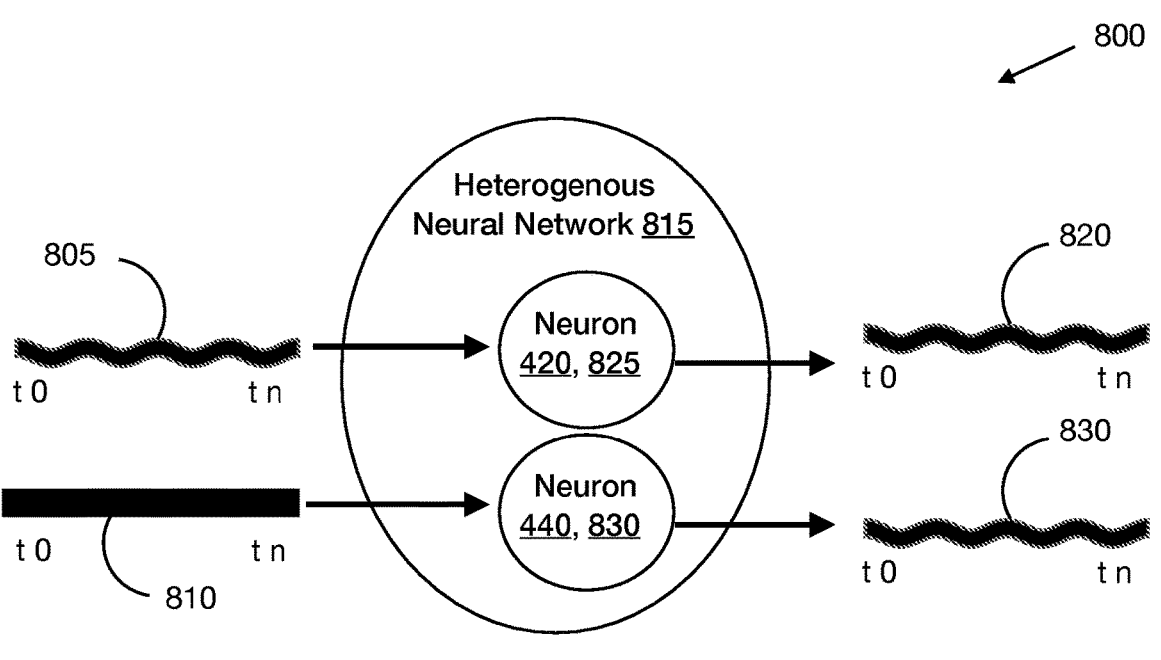
FIG. 8 is a data flow diagram of time series inputs and outputs for a heterogenous neural network.
FIG. 12 is a block diagram of possible cost function inputs.

FIG. 8 is a data flow diagram 800 of time series inputs for a heterogenous neural network 815 that may be used in some embodiments that also depicts intermediate values that can be used for a cost output. Inputs 805 and 810 are time series that run from $t_0$ to $t_n$ used as input into a heterogenous neural network. Only two neurons are shown for clarity, but a much larger neural net can be envisioned, such as shown in FIG. 4. Time series 805 has a variety of inputs, while time series 810 is a constant value. In some embodiments, a constant value may be stored as a single value, rather than as a time series. In this illustrative example, two inputs are shown, but there is no restriction on the number of inputs. Outputs 820, are also time series from time series that run from $t_0$ to $t_n$. that may come directly from neurons e.g., 420, 825 and 440, 830 deep within the neural net, not only from a defined output level. The time series of values 820, 830 may be used as simulated values for use in a cost function. These can be considered intermediate values within the neural network, as they do not come from a traditional output level, but can come from anywhere within the neural network. This is just an illustrative embodiment; the disclosures are also intended to be used with neural networks that do not use time series data.

Figure 9:
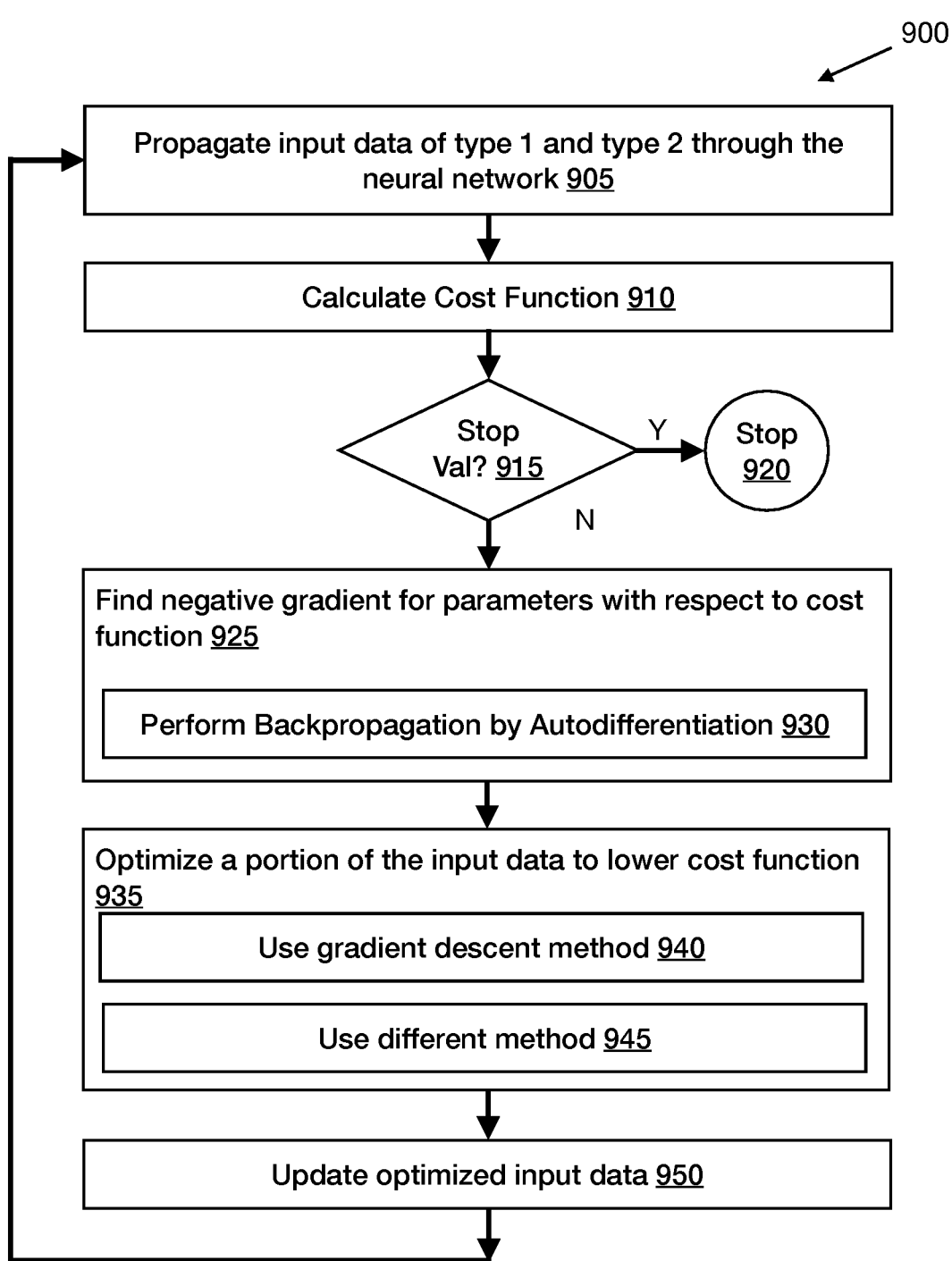
FIG. 9 is a flow chart illustrating aspects of running a heterogenous neural network.

FIG. 9 illustrates a flow chart 900 illustrating aspects of running a neural network with subdomain training. The operations of flow chart 900 are meant to be illustrative. In some embodiments, method 900 may be accomplished with one or more additional operations not described, and/or without one or more of the operations discussed. Additionally, the order in which the operations of method 900 are illustrated in FIG. 9 and described below is not intended to be limiting. In some embodiments, the flow chart 900 may be considered all or a portion of a neural net optimizer.

In some embodiments, the neural network has multiple types of inputs. In some embodiments, the neural network has inputs of type one, inputs of type two. As discussed earlier, inputs of type one may be Property/permanent value inputs, and inputs of type 2 may be temporary value inputs. At operation 905, input data, which may be of different types, is propagated through the neural network.

Figure 10:
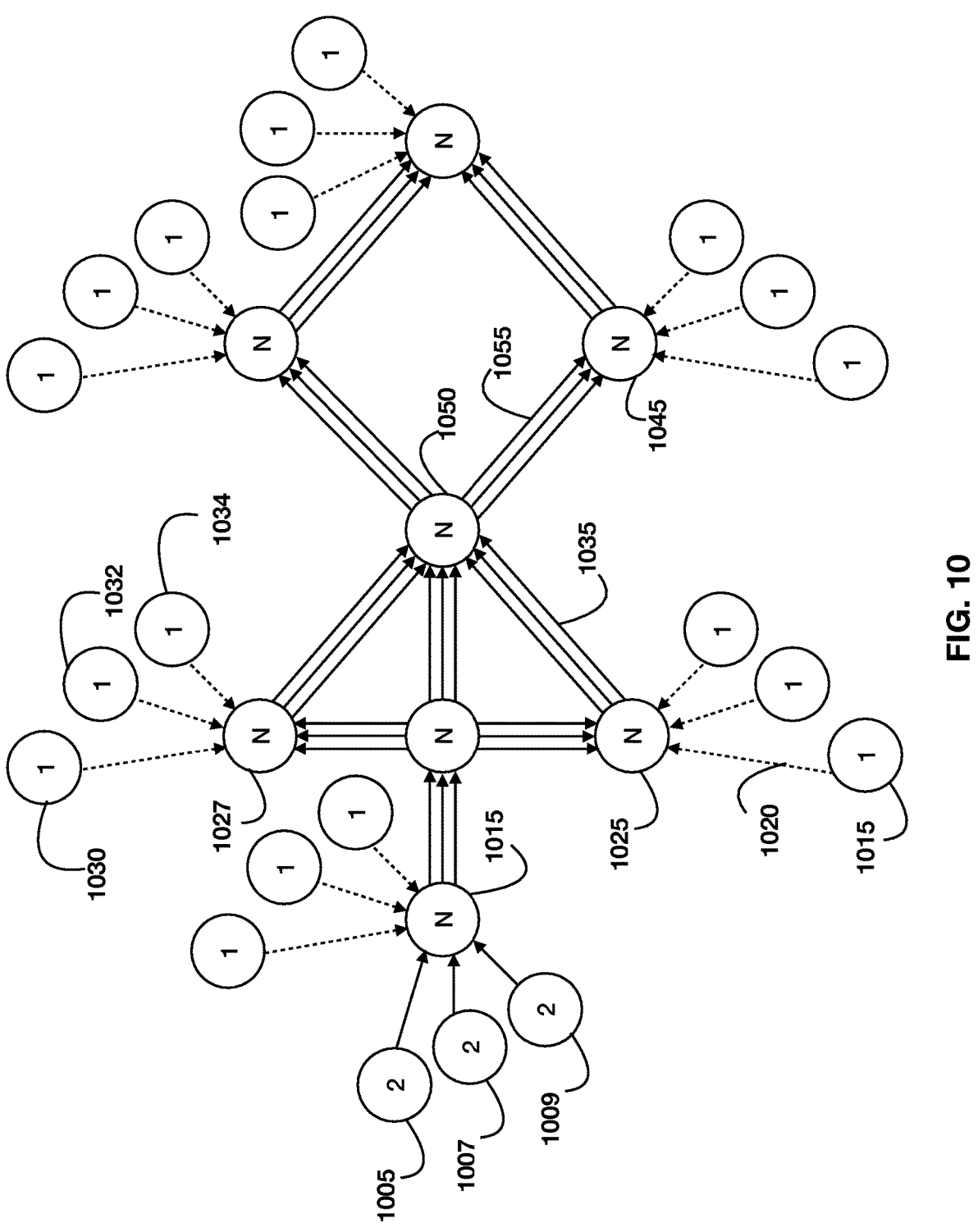
FIG. 10 is a data flow diagram of a heterogenous neural network that highlights propagating data forward.

FIG. 10 is a data flow diagram 1000 of a neural net that highlights forward propagating data from the inputs to the output(s). The heterogenous neural network disclosed here is a rough approximation for a heterogeneous neural network that can be used to model the structure shown in FIG. 3. Neurons are marked by a circle containing an "N". Neuron 1015 represents Wall 1 305. Neuron 1025 represents Zone 2 330. Neuron 1050 represents Wall 3 315, and neuron 1045 represents Zone 3 335. The location of the other neurons in the neural network are arranged in the order of the structure location they represent. This exemplary heterogenous neural network has two types of inputs, type 1, illustrated with a circle containing a "1;" and inputs of type 2, illustrated with a circle containing a "2."

Inputs of type 1, in this illustrative embodiment, are used by the neuron they are attached to exclusively. They have a value, which may be a constant value, e.g., 810, that is passed along an edge to their connected neuron. The value is used by the activation function of the neuron, but in some embodiments, is not otherwise passed on. An input of type one is indicated by a dashed line 1020 that runs, for example, from an input 1015 to a neuron 1025. With reference to FIG. 7, these inputs may be permanent inputs, 722, that describe the composition of the matter being modeled, such mass 725, 1030, layer heat capacity 730, 1032, and heat transfer rate 735, 1034, and, in some circumstances, do not travel beyond the first neuron they are used in. For example, inputs of type 1 1030, 1032, and 1034 propagate into neuron 1027, but then do not travel beyond that as individual values. Inputs of type 2 (with solid lines indicating path), in some embodiments, are used to propagate data throughout the network. These may be considered temporary inputs 707, such as temperature 710, 1005, Mass Flow Rate 715, 1007, and Pressure 720, 1009, all associated here with neuron 1015. These three inputs are then propagated through the model as indicated by the three arrow groupings 1035. Each input has a value that is used initially associated with and edge that connects to a neuron.

At operation 910, a cost function is calculated. A cost function (also sometimes called a loss function) is performance metric on how well the neural network is reaching its goal of generating outputs as close as possible to the desired values. To create the cost function we determine the values we want from inside the neural network, retrieve them, then make a vector with the desired values; viz: a cost $C=(y,0)$ where y=desired values, and 0=network prediction values. These desired values are sometimes called the "ground truth." With reference to FIG. 3, Zone 1 325 has a sensor 345 which can record state within the zone. Similarly, Zone 4 340 has a sensor 350 which can also record state values. Sensors from these two zones can output information that creates time series values that can be used to create the desired values to determine how accurately the neural network is modeling the system 300. In some embodiments, desired values may be synthetic, that is, they are the values that are hoped to be reached. In some embodiments, the desired values may be derived from actual measurements.

The function to determine the cost based on these values may be any cost function that is known to those of skill in the art, such as mean squared error, cross-entropy cost, exponential cost, and so on. In embodiments, intermediate values from a node taken from inside the neural network are used for the network prediction values. For example, with reference to FIGS. 5A and B, neuron 2 510A could correspond to a location in a building whose temperature is being measured. A time series of the temperature ($T_2$) 505B of neuron 2 510A could be collected and used as the network prediction values for the cost function. Variables that are stored in neurons, such as, for example, the values in FIGS. 5A and 5B can be considered intermediate values. These intermediate values can be collected as time series data, and can be used as network prediction values for a cost function.

Continuing the example from FIG. 3, there are two sensors who gather sensor data. The desired values are time series of the actual temperatures from the sensors. The network prediction values are not determined from a specific output layer of the neural network, as the data we want is held within neurons within the network. With reference to FIGS. 6 and 7, the wall neurons and the zone neurons 705 in our sample model hold a temperature value 710. The network prediction values to be used for the cost function are, in this case, the values (temperature) within the node 420 that corresponds to Zone 1 325 (where we have data from sensor 345) and the values (temperature 710) within the node 440 that correspond to Zone 4 340, with sensor 350.

When the model is run, a record of the temperature values from those zones can be accumulated, such as shown with reference to FIGS. 3, 4, and 8. Neuron 440, 825, corresponding to Zone 1 325 produces a time series value 820, which may be an internal temperature from time t0 to tn; and neuron 440, 830 which may be another internal temperature from time t0 to tn or a different value. These are our network prediction values. In the instant example, the desired values are data from the sensors 345 and 350. Once the we have the network prediction values and the desired value, we can calculate the cost function, which quantifies the error between what the model predicts and the desired values and presents it as a single number. This cost function can be calculated by any method known to those of skill in the art. For example, mean squared error, cross-entropy cost, exponential cost, and so on.

At operation 915, a stop value is determined. The stop value may be that a cost function value has been reached, a cost function range of values has been reached, the program has run for a given time, the program has run for a given number of iterations, etc. If the stop value has been reached, then at operation 920 the model simulation stops.

At operation 925, if the stop value has not been reached, then partial derivatives are found with respect to the cost function for the parameters within the neural network. These partial derivatives may be negative gradients with respect to the cost function. With reference to FIG. 7, in some embodiments, all of the internal parameters, e.g., 707-735 of each neuron have their partial derivatives calculated. Even though the example neurons have similar parameters, this is not a requirement. Different neurons may have different parameters. For example, a neuron modeling a pump may have parameters such as density, shaft speed, volume flow ratio, hydraulic power, etc. If the derivatives are differentiable, then backpropagation can be used to determine the partial derivatives. Backpropagation finds the derivative of the error (given by the cost function) for the parameters in the neural network, that is, backpropagation computes the gradient of the cost function with respect to the parameters within the network.

Backpropagation calculates the derivative between the cost function and parameters by using the chain rule from the last neurons calculated during the feedforward propagation 905, through the internal neurons, to the first neurons calculated. As an example, with reference to FIG. 11, the backpropagation will follow the arrows from right to left and backpropagate to the inputs of all types; in this case, type 1 and type 2. More specifically, backpropagation will backpropagate from neuron 1145, through neuron 1135, to input of type 1 1140. At operation 930, in some embodiments, backpropagation will be performed by automatic differentiation. According to Wikipedia, "automatic differentiation is accomplished by augmenting the algebra of real numbers and obtaining a new arithmetic. An additional component is added to every number to represent the derivative of a function at the number, and all arithmetic operators are extended for the augmented algebra." Other methods may be used to determine the parameter partial derivatives. These include Particle Swarm and SOMA ((Self-Organizing Migrating Algorithm), etc. The backpropagation may work on a negative gradient of the cost function, as the negative gradient points in the direction of smaller values.

At operation 935, some of the input data is optimized to lower the value of the cost function. For example, input data of type 1 may be optimized., while input data of type 2 is not. Many different optimizers may be used, which can be roughly grouped into 1) gradient descent methods and 2) other methods. At operation 940, a gradient descent method is used. These methods commonly take the negative gradient determined in step 925 to decrease the error function of specific inputs. Among the gradient descent methods are standard gradient descent, stochastic gradient descent, and mini-batch gradient descent. At 945, another method of optimization is used. Among other methods are Momentum, Adagrad, AdaDelta, ADAM (adaptive movement estimation), and so on.

At operation 950, the input data of the type or types that are being changed is updated. The activation function of a neuron may also use the inputs of any type. In some embodiments, inputs of one or more types are sent on through the neural network. In the model described in FIG. 10, inputs of type 2 are sent on through the model, while inputs of type 1 are used in their neurons only. For example input 1005 of type 2, which may be temperature, is sent along to the neuron 1015. The activation function is calculated using all parameters present in the neuron. This gives, among other variable values, an updated temperature value. The temperature value is both sent forward on an edge to all connected neurons and kept in the neuron until supplanted by a new temperature value. Thus, values in a neuron, such as temperature, can be used for information about the physical object that the neuron represents, which might be a wall, a zone of building, etc.

The forward propagation through the neural net continues along all edges for all types of inputs; for example, from neuron 1015 to neuron 1025, then through the edges 1035 to neuron 1050, through edge 1055 to neuron 1045, then to the neuron 1065. In this figure, there are three edges between neurons in the neural network, but this is not required. There can be any number of edges between any two neurons.

Figure 11:
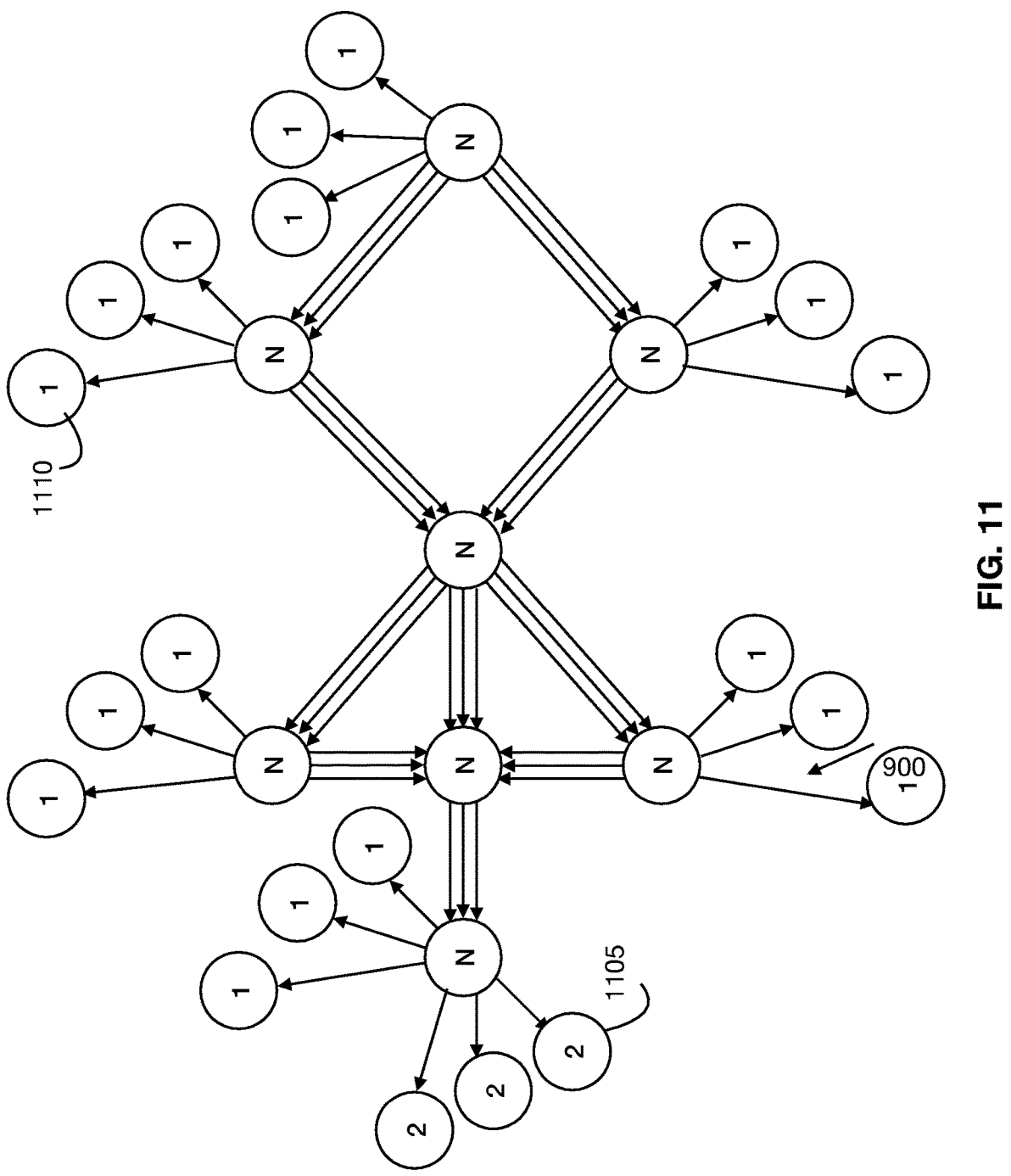
FIG. 11 is a data flow diagram of a heterogenous neural network that highlights backpropagation.

FIG. 11 is a data flow diagram disclosing backpropagation according to several embodiments discussed herein. After the forward propagation, and after the cost function is determined, the neural net is traversed in reverse, with the partial derivative being calculated for each parameter. All the arrows in FIG. 11 are traversed. Inputs of both type 1, e.g., 1110 and type 2, e.g., 1105, are traversed and have their partial derivatives determined with respect to the cost function.

At operation 935 a portion of the input data is optimized to lower the cost function. Optimizers are algorithms that are used to change the parameters within the neural network to reduce the cost function. In some embodiments, the gradient descent is performed for only the inputs whose values are being taken. For example, inputs of type 1 only may be determined by an optimizer, or inputs of types 2 only may be determined by an optimizer. For example, with reference to FIG. 7, inputs of type 1 have to do with the physical nature of the structure. Optimizing them optimizes the ability of its corresponding heterogenous neural network to more closely model the building behavior. Inputs of type 2 are states within the building. Optimizing those inputs allows state flows within the building to be optimized for, for example, the least amount of state needed to achieve a desired goal. This may allow, among other uses, a building to optimize its energy usage. At operation 940 a gradient descent method is used for the input optimization, such as gradient descent, stochastic gradient descent, mini-batch stochastic gradient descent, adaptive gradient, etc. At operation 945, a different optimization method, such as AdaDelta, RMSprop, ADAM, etc., may be used. At operation 950, the chosen input data (e.g., type 1, or type 2 in our current example) is updated. This process is continued until a stopping state is reached.

Conceptually, determining the behavior of a physical system (such as that shown in FIG. 3) can be done running a neural network (such as that shown in FIG. 4), which may be called a structure simulation model. This structure simulation model comprises inserting some amount of some measurable state into the neural network model that models the physical system. This state can be temperature, humidity, acoustic, vibration, magnetic, light, pressure, moisture, etc. This state then propagates through the different layers of the simulation (e.g., wall 1 305 through wall 2 310 to wall 3 315, etc.), which affects the state of the different areas in the structure. This illustrative example uses temperature to describe aspects of the system and methods—(brick, insulation, drywall, etc.) heating up rooms, as represented by inside nodes. An outside node is associated with a time heat curve T. The curve value at time $T_1$ is injected into one or more outside nodes. This temperature is propagated through the building (by the values of the nodes of the simulation neural nets). The outside of the building (say, brick), has its temperature modified by the outside node and known aspects of how heat transfers through brick as found in the brick node. The brick then heats up the next layer, perhaps insulation. This continues throughout the building until an inside node is reached. At inside nodes, other functions can be applied, such as those that represent lighting and people (warmth) within the zone. State information continues to propagate until another outside layer is reached, with individual node parameter values representing the heating present in the building at time $T_1$. In some embodiments, each outer surface has its own time temperature curve. In some embodiments a building is deconstructed into smaller subsystems, (or zones) so rather than propagating temperature through the entire structure, only a portion of the structure is affected by a given input.

Occupancy comfort can be atomized to the comfort of specific humans. Parameters that can be determined on a person-specific level comprise: heat of person, convection, sweat, activity levels, metabolic rate, location, coo (the insulation value of the clothing a person is wearing). In one embodiment, some portion of the building may have a file of person (height, weight). The building may also be able to monitor activity level by, for example accessing a wearable fitness device or a phone associated with someone in the building. Through this information automation processes in the the building may be able to infer metabolic rate (met). Using the metabolic rate the automation system may be able to make a good guess as to what temperature (or other states) the person with the wearable fitness device would prefer. A person could also have temperature and other building state preferences on file that the automation system then attempts to meet (within the other competing needs within the building.)

The comfort goal may be used to determine permissible comfort values. It is a number value (such as a value between 0 and 3) that defines how close to absolute comfort we hope the model to get. The comfort goal, in some implementations, gives an allowable error range for the final resource control state curves; a low value may indicate that the comfort curve must be closely matched, while a higher number may indicate that there is more leeway allowed. The values may be reversed, such that a low value indicates a higher tolerance for error, etc.

The desired target path is a possible name for a state curve that models chosen comfort qualities such as temperature. A person (or an object) may have an ideal temperature at 70 degrees, for a specific example. However, how people and objects experience temperature is dependent on more than just the straight temperature. It also depends on, e.g., humidity, air flow, radiant heat, and so on. Different state curves with different values may match the desired target path. For example, higher humidity and lower temperature may be equivalent with state curves modeling lower humidity and higher temperature. The desired target path can also be considered the ground truth.

This target path may take the form of a time series of state values. There may be one time series for each modulatable zone, or there may be more than one time series for a zone; zones may share time series. The building model may model many different state time series simultaneously. Such state time series may be humidity, co2 level, temperature, voc, etc.

One way to model the amount of state is to model one or more modulatable resources that input energy into the simulation model. These resources may model equipment, just general state (eg. heat) moving into the structure, weather, changes to state caused by occupancy; changes to state caused by lighting, and so on. As an example, if a formerly empty 70 degree conference room fills up with 50 bodies in a period of minutes, this extra heat may be accounted for here.

As a brief overview, to optimize this model, we first determine what state values the building should have. A person (or an object) may have an ideal temperature at 70 degrees, for a specific example. However, how people experience temperature is dependent on more than just the straight temperature. It also depends on, e.g., humidity, air flow, radiant heat, and so on. Different state curves with different values may match the desired target path. For example, higher humidity and lower temperature may be equivalent with state curves modeling lower humidity and higher temperature. We combine all of this information to determine time-series comfort curves for the different building zones.

Generally, the model runs by iteratively taking what we want as output, for this example, heat, as input into the simulation model, run for a specified period of time, and outputs a simulated version of what we are using as input. These high level inputs and outputs can be seen in the FIG. 13. At a high level, the output of comfort model, load curves, can be used as input for the building model. The output of the building model, source curves (energy needs per zone), can then be used as input to an equipment model. The output of the equipment model are control curves, which describe an optimal way to run the equipment in the building.

At a specific level, models are run iteratively to optimize values by using the high level output as input and the input as output. So, for example, the building model iteratively runs by choosing a set of values for load curves, running them through the building model, which outputs simulated source curves. These are then checked to see how closely they match the given source curves. The difference between the simulated source curves and the ground truth source curves are checked using a cost function, described elsewhere. Then, using back propagation or something similar, a new set of load curves are chosen that should produce output closer to the given source curves.

The equipment model behaves similarly. The high-level output, control curves, are used as input, the equipment model is run and outputs simulated load curves. These load curves are checked against the initial input load curves using a cost function, then a new set of control curve inputs are chosen using autodifferentiation or backpropagation. This process continues until the initial load curves are close enough to the simulated load curves, at which time the last control curve simulated is used as the answer.

To commission a building, the model is run into the future for a time, sensor data is gathered from a building being modeled; how close the model and the sensor information are is checked; then the model is iteratively run, changing model parameters until the model and the sensor information are close enough together. This can be done both for a building model and a resource model.

Figure 13:
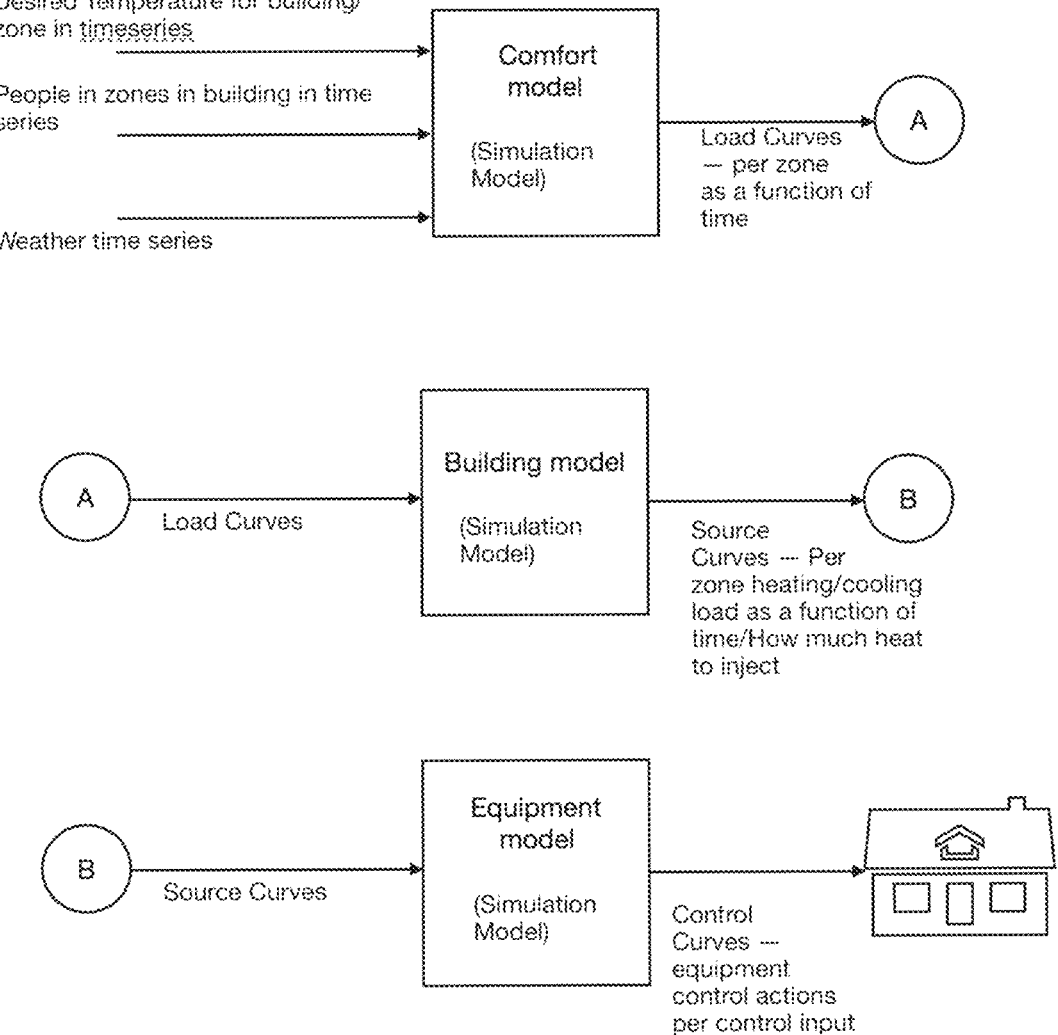
FIG. 13 is a diagram of high level inputs and outputs of a structural (building model) and other related models.
Figure 14:
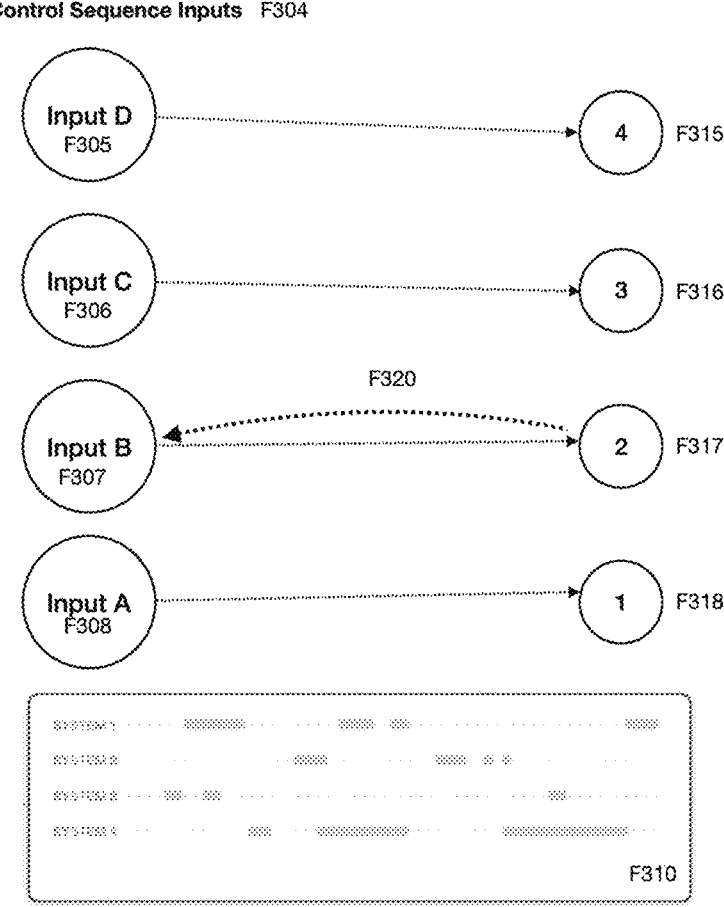
FIG. 14 is a diagram that illustrates four control sequences.
Figure 15:
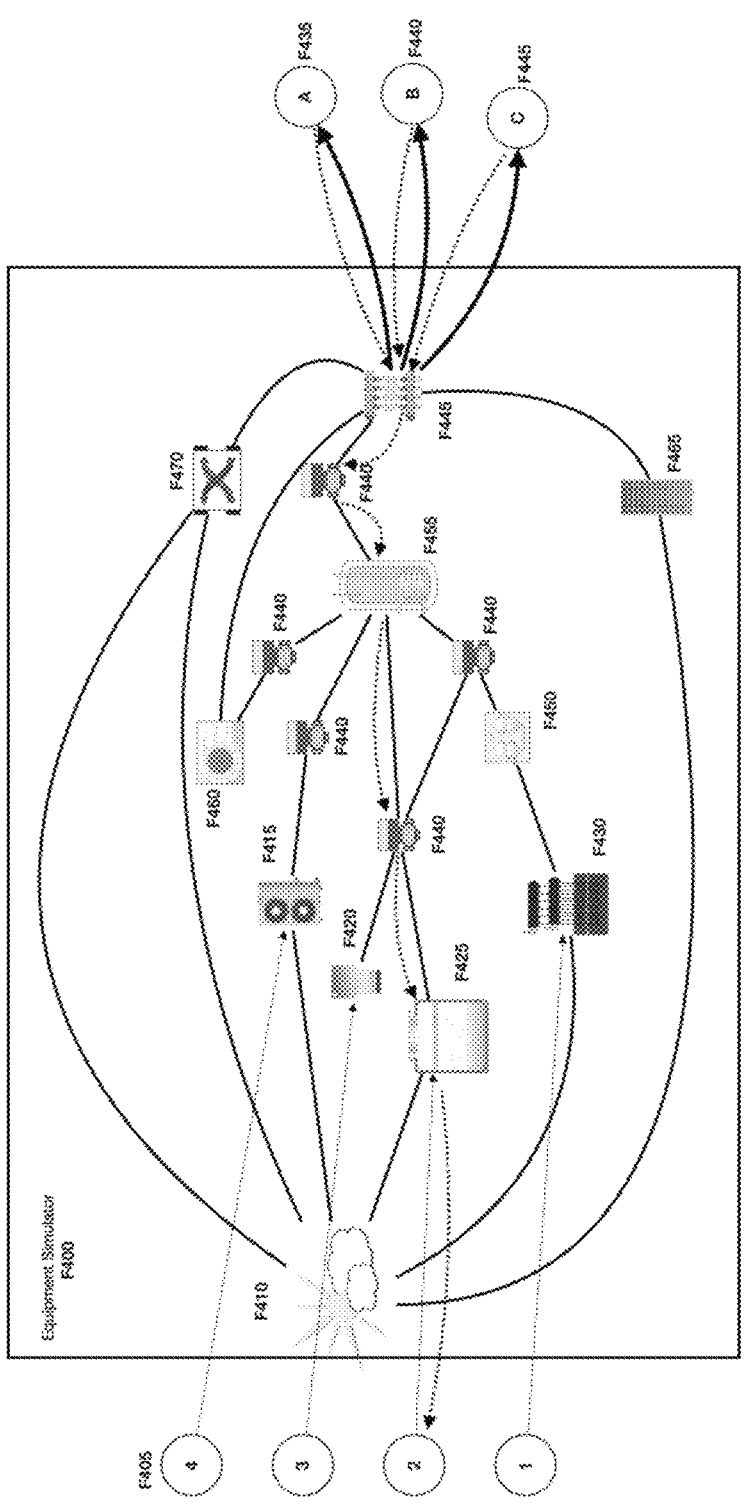
FIG. 15 is a diagram that illustrates running an equipment simulator with four control sequences.

With reference to FIGS. 13, 14, and 15, a system is shown with four control sequence inputs and three zones to be controlled. With reference to FIG. 14, an equipment thermodynamic model is described. This model comprises pieces of equipment and other things that affect them (e.g., the weather) that are connected. The connections allow thermodynamic properties to flow through the model using physics principles. Control sequences F405 are sent to nodes representing equipment F415, F420, F425, and F430. The weather F410 can be included in the equipment model. If included, each of the pieces of equipment that is affected by the weather F410—in this case F415, F425, F430, F465, and F470—has a connection with the weather, as are visualized by the lines between the weather 410 and the equipment F415, F425, F430, F465, and F470. The weather may be a temperature curve.

The equipment model implementation shown here has four pieces of equipment that can be controlled F415, a hydronic chiller, F420, a gas boiler, F425, a cooling tower, F430, and a ground loop heat pump F435 by feeding control sequences F405 to the nodes representing the equipment as the model is run. Also in the equipment model are a number of pumps F440, a load manifold F445, a ground source heat pump F450, a hot water tank F455, a fan F460, a PV Panel, and a Heat Recovery Ventilator F470. This may model the equipment in an existing building or may model equipment in a simulated building.

With reference to FIG. 14, since there are four pieces of equipment that can be controlled (each with a single controller), the model uses four time series control sequence input curves (F305, F306, F307, F308) as input. Some pieces of equipment have more than one control. In such a case, the total number of controls may determine the number of control sequence curves. Some of the controls have restrictions in values that they can input. These restrictions may be reflected in the values that are allowed for the control sequence inputs, with disallowed values for the control also being disallowed for the inputs F304. If some control values allow only some values, those restrictions may affect the chosen numbers. For example, systems may be either on or off, as in this example. The first time the equipment model is run, an initial time series control sequence F115 (or sequences) must be chosen. The values may be chosen randomly.

F310 shows a sample of control sequence inputs. For these pieces of equipment, the allowable values are on and off. Systems 1-4 show periods where the equipment is on, and other periods where the equipment is off.

With reference to FIG. 15, an equipment thermodynamic model F410 is shown. The numbers 1 through 4 and their attached arrows represent the control sequence inputs being fed into equipment that accepts inputs F415, F420, F425, F430. Notice that the boiler F420 is not affected by the weather, unlike the other equipment that will be controlled to provide state (in this case, heat) into zones within a simulated building. The state (in this case heat) diffuses through the equipment model to, in this case, a load manifold. For this instance, with reference to figure F5, that state is used to determine what the state will be at the three zones F525, F530, and F535, in this model, for a given time period. The state is defined as temperature output curves F530, F540, F550. A cost function F125, F570 is then used to measure the difference between these state output curves F530, F540, F550, and the Target State Needed by Zone Path curve(s) F110, F555, F560, F565 (target curves). The target curves are the ground truth. A cost function comprises something (or things) to be minimized or maximized in the equipment model. For example, the cost function doesn't only measure how well a state output curve F530, F540, F550 matches a Target State Needed by Zone Path curve(s) F110, F555, F560, F565, but also meets some other criteria, such as if it does so at the cheapest energy cost. Some of the values that the cost function F205 can be checked to see if it minimizes or maximizes are a next time series control sequence of operation error F210, a next time series output path error F215, an energy cost F220, a state cost F225, least short cycling frequency F230, frequency of sequence changes F235, equipment life cost F240, or comfort value F245.

Figure 16:
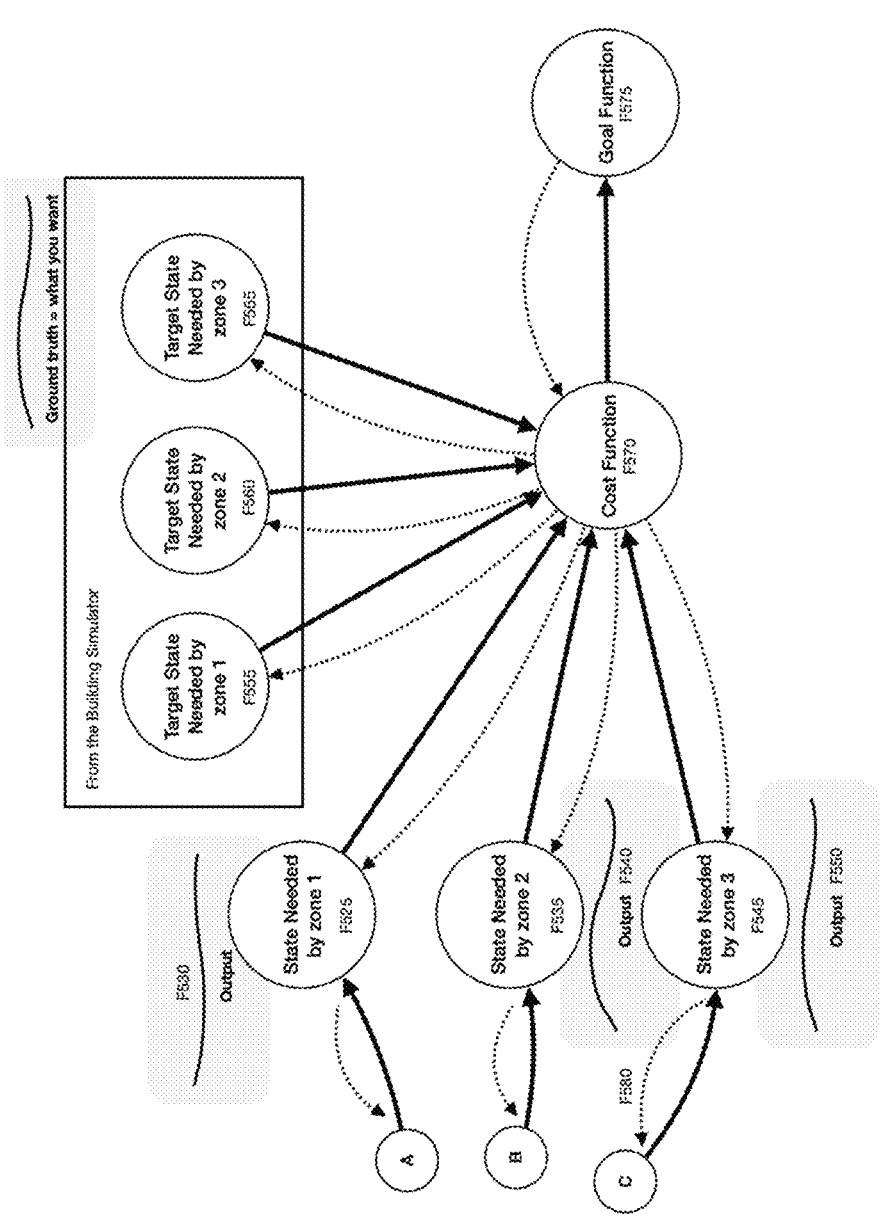
FIG. 16 is a diagram that illustrates state moving through an equipment simulator.

With continuing reference to FIGS. 14, 15, and 16, once the cost function value has been determined, a new set of control sequence inputs must be determined. In some versions, differentiation is used to figure out the next set of control sequence inputs. Generally, the current outputs are compared with the desired outputs. what direction a new set of inputs should move towards is determined. Then, using that information, new inputs are chosen. If a differentiable function is being used to run the thermodynamic model, then, in one implementation, a reverse gradient of the cost function is taken forward, then a gradient of the thermodynamic model is sequentially taken backward to the inputs to determine a new set that should more closely produce output that more closely approximates the ground truth. Those of skill in the art will recognize that this is very similar to backpropagation.

FIG. 12 is a block diagram 1200 illustrating aspects of cost function inputs 1205 which may be used with embodiments disclosed herein. The cost function determines the difference between the desired values and the predicted values received from running the neural network. Often, the cost function will be based on a time series of value that run from a first time value 1 to the last time value that was run, n 1210; that is, time series values from 1 to n. Sometimes other methods are used. For example, in some embodiments, when choosing whether the predicted values are close enough to the desired values, certain time series values may be given more weight than other values, giving a weighted time series of values 1215. For example, weights may be adjusted based on the time distance from a first time value 1120. This may be performed in any reasonable manner, as understood by those of skill in the art. When the model is run then, closer distance to earlier desired value data will carry more weight than later values which may be more divergent. In some implementations, values that are closer to the end of the time series may be given successively greater weights than earlier values. One way values may be weighted is by adjusting values based on time distance from a first time value. Later time values may be given successively lower weightings, successively higher weightings, or another weighting may be used. In some embodiments, an increasing time series of values from, e.g., 1 to n+k, may be used for inputs 1225 into the neural network and thus, into the cost function, as well, as there will be a larger time series of values to use as the cost function. If, at time n, (e.g., the end of the neural network model run) a stopping state has not been reached, (e.g., the cost has not reached a desired value, a threshold value (e.g., a limit or a boundary), is not between two values, etc.), then the model may be rerun for a longer time 1225. For example, the neural network model may run time series data timesteps from time 1 to time n+k. The number "k" may be any desired number that a user considers reasonable.

The networks described herein may be heterogenous neural networks as described with reference to FIGS. 2-7. Heterogenous neural networks, in some embodiments, comprise neural networks that have neurons with different activation functions. These neurons may comprise virtual replicas of actual or theoretical physical locations. The activation functions of the neurons may comprise multiple equations that describe state moving through a location associated with the neuron. In some embodiments, heterogenous neural networks also have neurons that comprise multiple variables that hold values that are meaningful outside of the neural network itself. For example, a value, such as a temperature value (e.g., 719) may be held within a neuron (e.g., 640) which can be associated with an actual location (e.g., 540).

In view of the many possible embodiments to which the principles of the disclosed invention may be applied, it should be recognized that the illustrated embodiments are only examples of the invention and should not be taken as limiting the scope of the invention. Rather, the scope of the invention is defined by the following claims. We therefore claim as our invention all that comes within the scope and spirit of these claims.

We claim:

1. A system for optimizing a heterogenous neural network, comprising: a processor; a memory in operational communication with the processor, a neural network with at least one neuron input, which resides at least partially in the memory, the neural network comprising neurons with type one inputs originating into the neurons themselves and not transferred along to other neurons, neurons with type two inputs originating from the at least one neuron input and transferred along to other neurons, and a neural network optimizer including instructions residing in memory which are executable by the processor to perform a method which includes:

propagating type two inputs of a second type forward through the neural network;

calculating a cost function based on 1) values within the neurons within the neural network and 2) desired values;

backpropagating a gradient of the cost function through the neural network;

using optimization to reduce error only for the type two inputs;

updating the type two inputs to produce an optimized output of the heterogenous neural network; and using the optimized output to produce at least one equipment control action;

wherein a second neuron represents a first building portion, wherein a third neuron represents a second building portion, wherein the first building portion and the second building portion are connected, and wherein the second neuron and the third neuron are connected.

2. The system of claim 1, wherein the cost function comprises a weighted series of differences between output of the neural network and a time series of zone sensor values.

3. The system of claim 2, wherein weights of the weighted series of differences are adjusted based on time distance from a first time value.

4. The system of claim 1, wherein type one inputs are temporary value inputs and type two inputs are permanent value inputs.

5. The system of claim 1, wherein at least one of the type one inputs and at least one of the type two inputs in at least one neuron are used in an activation function of the at least one neuron.

6. The system of claim 1, wherein the heterogenous neural network has at least a first level connecting to a second level, the second level connected to a third level, and wherein at least one signal from at least neuron travels from the first level to the third level.

7. A method for optimizing a neural network, comprising:

propagating type two inputs through neurons of the neural network, wherein the type two inputs originate from at least one neuron input and are transferred along to other neurons;

using type one inputs to determine activation functions within the neurons, the type one inputs originating into the neurons themselves and not transferred along to other neurons;

calculating a cost function based on 1) values of the neurons within the neural network and 2) desired values;

backpropagating a gradient of the cost function through the inputs to produce an optimized output of the neural network;

updating the type two inputs;

and using the optimized output to produce at least one equipment control action;

wherein a second neuron represents a first building portion, wherein a third neuron represents a second building portion, wherein the first building portion and the second building portion are connected, and wherein the second neuron and the third neuron are connected.

8. The method of claim 7, wherein an activation function of at least one neuron comprises a multi-variable equation.

9. The method of claim 8, wherein the at least one neuron has an activation function, and wherein the activation function uses a variable from a different neuron.

10. The method of claim 8, wherein at least one of the type one inputs and at least one of the type two inputs in at least one neuron are used in an activation function of the at least one neuron.

11. The method of claim 10, wherein the neurons have at least one activation function, and wherein the at least one activation function comprises a multi-variable equation with at least one variable of a type one input and at least one variable of a type two input.

12. They method of claim 10, wherein the neurons have at least one activation function, and wherein the at least one activation function comprises multiple multi-variable equations.

13. The method of claim 7, wherein the neural network has at least a first level connecting to a second level, the second level connected to a third level, and wherein at least one signal from at least neuron travels from the first level to the third level.

14. A non-transitory computer-readable storage medium configured with data and with instructions that upon execution by at least one processor in a controller computer system having computer hardware, programmable memory, and a heterogenous neural network with at least one neuron input in programable memory, the heterogenous neural network having neurons with type one inputs originating into the neurons themselves and not transferred to other neurons, neurons with type two inputs originating from the at least one neuron input and transferred along to other neurons, and a neural network optimizer including instructions residing in memory which are executable by the at least one processor to perform a technical process for neural network subdomain training, the technical process comprising:

propagating type two inputs through the heterogenous neural network;

calculating a cost function based on 1) values within neurons within the heterogenous neural network and 2) desired values;

backpropagating a gradient of the cost function;

updating the type two inputs to produce an optimized output of the heterogenous neural network;

and using the optimized output to produce at least one equipment control action;

wherein a second neuron represents a first building portion, wherein a third neuron represents a second building portion, wherein the first building portion and the second building portion are connected, and wherein the second neuron and the third neuron are connected.

15. The non-transitory computer-readable storage medium of claim 14, wherein an activation function of a neuron comprises a multi-variable equation.

16. The non-transitory computer-readable storage medium of claim 14, wherein the heterogenous neural network has at least a first level connecting to a second level, the second level connected to a third level, and wherein at least one signal from at least neuron travels from the first level to the third level.

17. The non-transitory computer-readable storage medium of claim 14, wherein at least one of the type one inputs and at least one of the type two inputs in at least one neuron are used in an activation function of the at least one neuron.

* * * * *